US011004075B2

(12) United States Patent
Lee et al.

(10) Patent No.: US 11,004,075 B2
(45) Date of Patent: May 11, 2021

(54) DEVICE AND METHOD FOR PERFORMING PAYMENT USING UTTERANCE

(71) Applicant: Samsung Electronics Co., Ltd., Suwon-si (KR)

(72) Inventors: Je Min Lee, Yongin-si (KR); Yong Seok Park, Yongin-si (KR); Dong Ho Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/940,652

(22) Filed: Mar. 29, 2018

(65) Prior Publication Data

US 2018/0285881 A1    Oct. 4, 2018

(30) Foreign Application Priority Data

Mar. 29, 2017  (KR) .................. 10-2017-0039710

(51) Int. Cl.
*G06Q 20/40*  (2012.01)
*G06Q 20/32*  (2012.01)
(Continued)

(52) U.S. Cl.
CPC ..... *G06Q 20/40145* (2013.01); *G06Q 20/325* (2013.01); *G06Q 20/3274* (2013.01);
(Continued)

(58) Field of Classification Search
CPC ............ G06Q 20/40145; G06Q 20/32; G06Q 20/3278; G06Q 20/20; G06Q 20/3227;
(Continued)

(56) References Cited

U.S. PATENT DOCUMENTS

| | | |
|---|---|---|
| 8,831,949 B1 | 9/2014 | Smith et al. |
| 9,031,846 B2 | 5/2015 | Smith et al. |

(Continued)

FOREIGN PATENT DOCUMENTS

| | | |
|---|---|---|
| KR | 10-2005-0090568 A | 9/2005 |
| KR | 10-2012-0135838 A | 12/2012 |
| KR | 10-2017-0013848 A | 2/2017 |

OTHER PUBLICATIONS

ISA/KR, "International Search Report and Written Opinion of the International Searching Authority," Application No. PCT/KR2018/003702, dated Jul. 19, 2018, 14 pages.

(Continued)

*Primary Examiner* — Alexander G Kalinowski
*Assistant Examiner* — Sanjeev Malhotra

(57) ABSTRACT

An electronic device includes a touch screen display, a biometric sensor, an audio interface, a wireless communication circuit, a processor, and a memory. The memory stores instructions causing the processor to receive a selection of a first authentication scheme for a payment in a default scheme, to set the first authentication scheme as the default scheme, to receive a user utterance indicating a payment action task using a second authentication scheme, to transmit data associated with the user utterance to an external server, to receive a response including a state sequence of the electronic device for performing the payment action task and a parameter associated with the second authentication scheme, to perform the payment action task depending on the state sequence in the second authentication scheme, and to provide a user interface for changing the default scheme to the second authentication scheme.

20 Claims, 18 Drawing Sheets

(51) Int. Cl.
 *G07G 1/01* (2006.01)
 *G07F 9/02* (2006.01)
(52) U.S. Cl.
 CPC ............ *G06Q 20/409* (2013.01); *G07F 9/023* (2013.01); *G07G 1/01* (2013.01)
(58) Field of Classification Search
 CPC ...... G06Q 20/34; G06Q 20/36; G06Q 20/382; G06Q 20/4014; G06Q 20/3224; G06Q 20/3829; G06Q 20/10; G06Q 20/3223; G06Q 20/3255; G06Q 20/3274; G06Q 20/3276; G06Q 20/3674; G06Q 20/38215; G06Q 20/385; G06Q 20/4012; G06Q 40/02; H04W 12/06; H04L 63/0861; H04L 63/0853; H04L 9/3231; H04L 2209/56; H04L 2209/805; H04L 63/08; H04L 63/0823; G06F 21/32; G06F 21/6245; G06F 21/74; H04M 2201/40; H04M 3/523
 USPC ................ 705/14.72, 16, 39, 44, 71, 72, 75; 715/727; 713/155; 704/270.1; 379/88.01, 265.13; 235/382
 See application file for complete search history.

(56) References Cited

U.S. PATENT DOCUMENTS

| | | | | |
|---|---|---|---|---|
| 9,264,906 | B2 | 2/2016 | Smith et al. | |
| 2010/0061544 | A1* | 3/2010 | Pasquale | H04L 12/2854 379/265.13 |
| 2010/0088101 | A1* | 4/2010 | Knott | H04M 3/4936 704/270.1 |
| 2010/0252624 | A1* | 10/2010 | Van de Velde | G06Q 20/3827 235/382 |
| 2012/0109759 | A1* | 5/2012 | Oren | G06Q 30/02 705/14.72 |
| 2012/0197743 | A1* | 8/2012 | Grigg | G06Q 20/32 705/16 |
| 2013/0294589 | A1* | 11/2013 | Bushey | G10L 15/197 379/88.01 |
| 2014/0365895 | A1* | 12/2014 | Magahern | G06F 3/016 715/727 |
| 2014/0379344 | A1 | 12/2014 | Smith et al. | |
| 2015/0127549 | A1* | 5/2015 | Khan | G06Q 20/20 705/71 |
| 2015/0186887 | A1* | 7/2015 | Khan | G06Q 20/223 705/71 |
| 2015/0199684 | A1* | 7/2015 | Maus | G06Q 20/30 705/71 |
| 2015/0220933 | A1 | 8/2015 | Li | |
| 2015/0230095 | A1 | 8/2015 | Smith et al. | |
| 2015/0269543 | A1* | 9/2015 | Park | G06Q 20/06 705/39 |
| 2015/0317634 | A1* | 11/2015 | Angoy | G06Q 20/4012 705/44 |
| 2015/0347734 | A1* | 12/2015 | Beigi | H04L 9/3231 713/155 |
| 2016/0162902 | A1* | 6/2016 | Weiss | G06Q 20/401 705/44 |
| 2016/0224966 | A1* | 8/2016 | Van Os | G06Q 20/3224 |
| 2016/0247144 | A1* | 8/2016 | Oh | G06Q 20/20 |
| 2016/0253651 | A1* | 9/2016 | Park | G07F 9/023 705/39 |
| 2016/0253669 | A1* | 9/2016 | Yoon | G06Q 20/327 705/75 |
| 2016/0253670 | A1* | 9/2016 | Kim | G06Q 20/3674 705/72 |
| 2016/0259531 | A1 | 9/2016 | Cho et al. | |
| 2016/0260086 | A1 | 9/2016 | Cho et al. | |
| 2017/0048240 | A1* | 2/2017 | Chang | H04W 12/0609 |
| 2017/0053285 | A1* | 2/2017 | Kim | G06Q 20/38215 |
| 2017/0061436 | A1* | 3/2017 | Liu | H04M 1/72522 |
| 2017/0061437 | A1* | 3/2017 | Peng | H04L 63/0823 |
| 2017/0068953 | A1* | 3/2017 | Kim | G06Q 20/382 |
| 2017/0083882 | A1* | 3/2017 | Kim | G06Q 20/4012 |
| 2017/0169204 | A1* | 6/2017 | Fadell | G06F 21/316 |
| 2018/0332033 | A1* | 11/2018 | Lakhani | G06F 21/35 |

OTHER PUBLICATIONS

Supplementary European Search Report dated Jan. 2, 2020 in connection with European Patent Application No. 18 77 7478, 8 pages.

* cited by examiner

DEVICE AND METHOD FOR PERFORMING PAYMENT USING UTTERANCE

CROSS-REFERENCE TO RELATED APPLICATIONS AND CLAIMS OF PRIORITY

This application is based on and claims priority under 35 U.S.C. § 119 to Korean Patent Application No. 10-2017-0039710, filed on Mar. 29, 2017, in the Korean Intellectual Property Office, the disclosure of which is incorporated by reference herein its entirety.

TECHNICAL FIELD

The present disclosure relates to a technology that makes a payment by using utterance.

BACKGROUND

Due to the development of an information technology (IT) technology, an electronic device has significantly superior functions and provides a user with various functions. The electronic device may provide a multimedia service, for example, a music service, a video service, a digital broadcasting service, a call service, or a communication service based on a wireless Internet network.

Nowadays, financial technology (hereinafter referred to as "Fin-tech") that is a combination of a finance technology and the IT technology gets attention.

For example, manufacturers of electronic devices make various efforts in building a mobile payment platform, a mobile payment service, the spread of the evolved mobile banking, and the like through the cooperation of a credit card issuer or a bank.

For example, to implement the mobile payment service, a magnetic stripe transmission or magnetic secure transmission (MST) module may be mounted in the electronic device. The electronic device may complete a payment transaction with the conventional payment infrastructure (e.g., a point of sale (POS) terminal provided at credit card merchants, or the like) by using the MST module.

The above information is presented as background information only to assist with an understanding of the present disclosure. No determination has been made, and no assertion is made, as to whether any of the above might be applicable as prior art with regard to the present disclosure.

SUMMARY

If a user receives a payment request, an electronic device may perform user authentication in the set authentication scheme. For example, if the authentication scheme of the electronic device is set to a fingerprint authentication scheme and then the payment request is received, the electronic device may perform a procedure of the fingerprint authentication.

However, when the user desires to perform authentication in another authentication scheme instead of the set authentication scheme, the user needs to change the authentication scheme. As such, to change the authentication scheme may cause inconvenience to the user. For example, in the case where the user fails to change the authentication scheme, it may be impossible to make a payment by using the electronic device.

Aspects of the present disclosure are to address at least the above-mentioned problems and/or disadvantages and to provide at least the advantages described below. Accordingly, an aspect of the present disclosure is to provide an electronic device and a method that make a payment in an authentication scheme that a user desires, through utterance.

In accordance with an aspect of the present disclosure, an electronic device includes a housing, a touch screen display exposed through a first portion of the housing, a biometric sensor exposed through a second portion of the housing or integrated with the touch screen display, an audio interface disposed in a third portion of the housing, a wireless communication circuit placed inside the housing, a processor disposed inside the housing and electrically connected to the touch screen display, the biometric sensor, the audio interface, or the wireless communication circuit, and a memory disposed inside the housing and electrically connected to the processor. The memory stores instructions, when executed, causing the processor to receive, from a user, a selection of a first authentication scheme associated with at least one of the touch screen display, the biometric sensor, or the audio interface to use the electronic device for a payment in a default scheme, to set the first authentication scheme as the default scheme, after setting the first authentication scheme, to receive a user utterance indicating a payment action task using a second authentication scheme different from the first authentication scheme, by using the audio interface, to transmit data associated with the user utterance to an external server by using the wireless communication circuit, to receive a response including a state sequence of the electronic device for executing the payment action task and a parameter associated with the second authentication scheme, by using the wireless communication circuit, to execute the payment action task by using the electronic device depending on the state sequence in the second authentication scheme, and to provide a user interface for changing the default scheme to the second authentication scheme.

In accordance with another aspect of the present disclosure, an electronic device includes a housing, an audio interface disposed in a first portion of the housing, a processor disposed inside the housing and electrically connected to the audio interface; and a memory disposed inside the housing, electrically connected to the processor, and storing a payment application, a user authentication scheme of which is set to a first authentication scheme. the memory stores instructions, when executed, causing the processor to receive a user utterance by using the audio interface, wherein the user utterance indicates a payment action task using a second authentication scheme different from the first authentication scheme, to obtain a sequence of actions of the electronic device for executing the payment action task and a parameter associated with the second authentication scheme, from the user utterance, to execute the payment action task depending on the sequence of actions by using the electronic device in the second authentication scheme, and to provide a user with a user interface for changing the user authentication scheme to the second authentication scheme.

In accordance with another aspect of the present disclosure, an electronic device includes a housing, an audio interface disposed in a first portion of the housing, a processor disposed inside the housing and electrically connected to the audio interface, and a memory disposed inside the housing, electrically connected to the processor, and storing a payment application, a user authentication scheme of which is set to a first authentication scheme. The memory stores instructions, when executed, causing the processor to receive a user utterance through the audio interface, wherein the user utterance indicates a payment action task using a second authentication scheme different from the first authentication scheme, to obtain a sequence of actions of the electronic device for executing the payment action task and a parameter associated with the second authentication scheme, from the user utterance, to change the user authentication scheme to the second authentication scheme, and to execute the payment action task depending on the sequence of actions by using the electronic device in the second authentication scheme.

According to various embodiments of the present disclosure, a user authentication scheme for a payment may be easily changed by using a user utterance input. For another example, the user authentication scheme of a payment application may be changed and a payment may be made by performing user authentication once.

According to various embodiments of the present disclosure, an electronic device may reduce the delay caused by waiting for a response from the external server, by calling an external server for biometric authentication before executing a payment action task.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
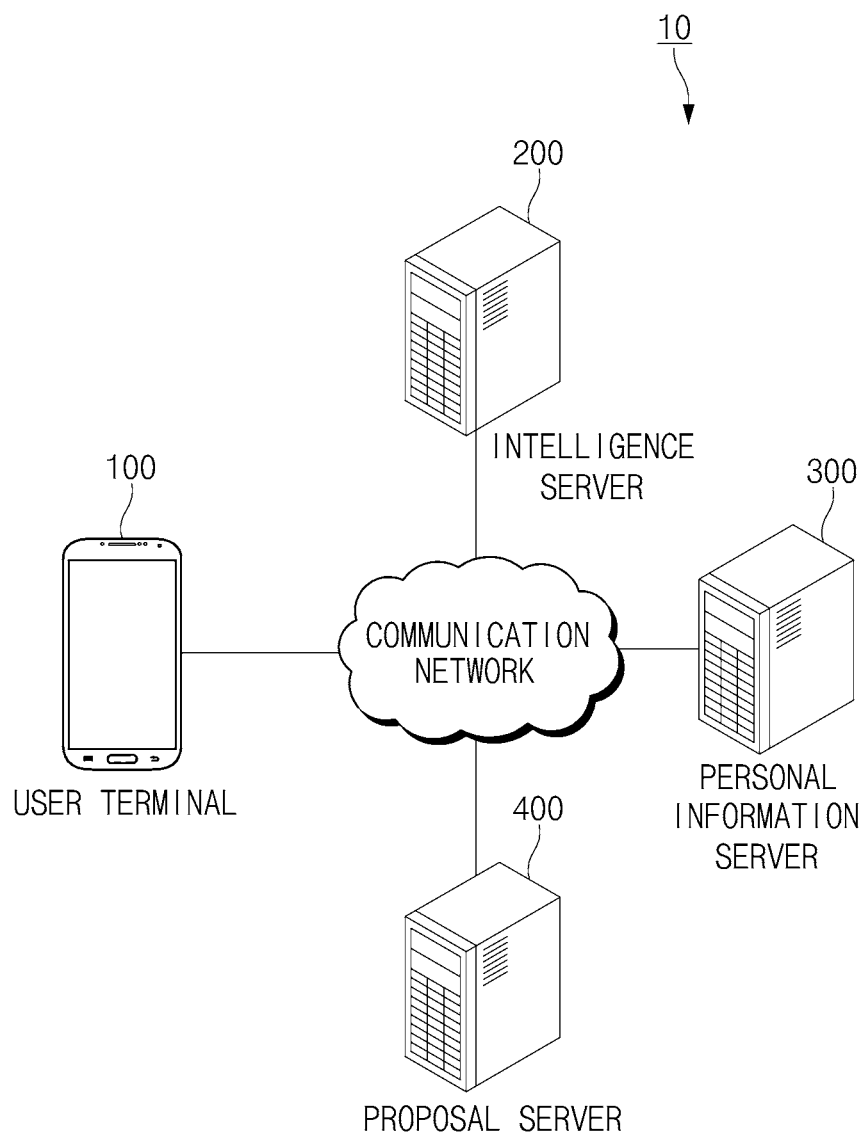
FIG. 1 is a view illustrating an integrated intelligent system according to various embodiments of the present disclosure.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described to be associated with accompanying drawings. Accordingly, those of ordinary skill in the art will recognize that modification, equivalent, and/or alternative on the various embodiments described herein can be variously made without departing from the scope and spirit of the present disclosure.

Before describing certain embodiments of the present disclosure, an integrated intelligent system to which an embodiment of the present disclosure is applied will be described.

FIG. 1 illustrates an integrated intelligent system, according to various embodiments of the present disclosure.

Referring to FIG. 1, an integrated intelligent system 10 may include a user terminal 100, an intelligence server 200, a personal information server 300, or a proposal server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to certain embodiments, various types of terminal devices (or an electronic device), which are connected with Internet, such as a mobile phone, a smartphone, personal digital assistant (PDA), a notebook computer, and the like may be the user terminal 100.

According to at least one embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the sequence of actions of the app (or the sequence of states). The user terminal 100 may receive the path rule, may select an app depending on the path rule, and may execute an action included in the path rule in the selected app.

For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action among a plurality of actions, in the display. In another example, the user terminal 100 may display the result obtained by executing the action in the display, in response to the user input.

The personal information server 300 may include a database in which user information is stored. For example, the personal information server 300 may receive the user information (e.g., context information, information about execution of an app, or the like) from the user terminal 100 and may store the user information in the database. The intelligence server 200 may receive the user information from the personal information server 300 over the communication network and may generate a path rule associated with the user input by using the received user information. According to certain embodiments, the user terminal 100 may receive the user information from the personal information server 300 over the communication network, and may use the user information received to manage the database.

The proposal server 400 may include a database storing information about a function in a terminal, introduction of an application, or a function to be provided. For example, the proposal server 400 may include a database associated with a function that a user utilizes by receiving the user information of the user terminal 100 from the personal information server 300. The user terminal 100 may receive information about the function to be provided from the proposal server 400 over the communication network and may provide the received information to the user.

Figure 2:
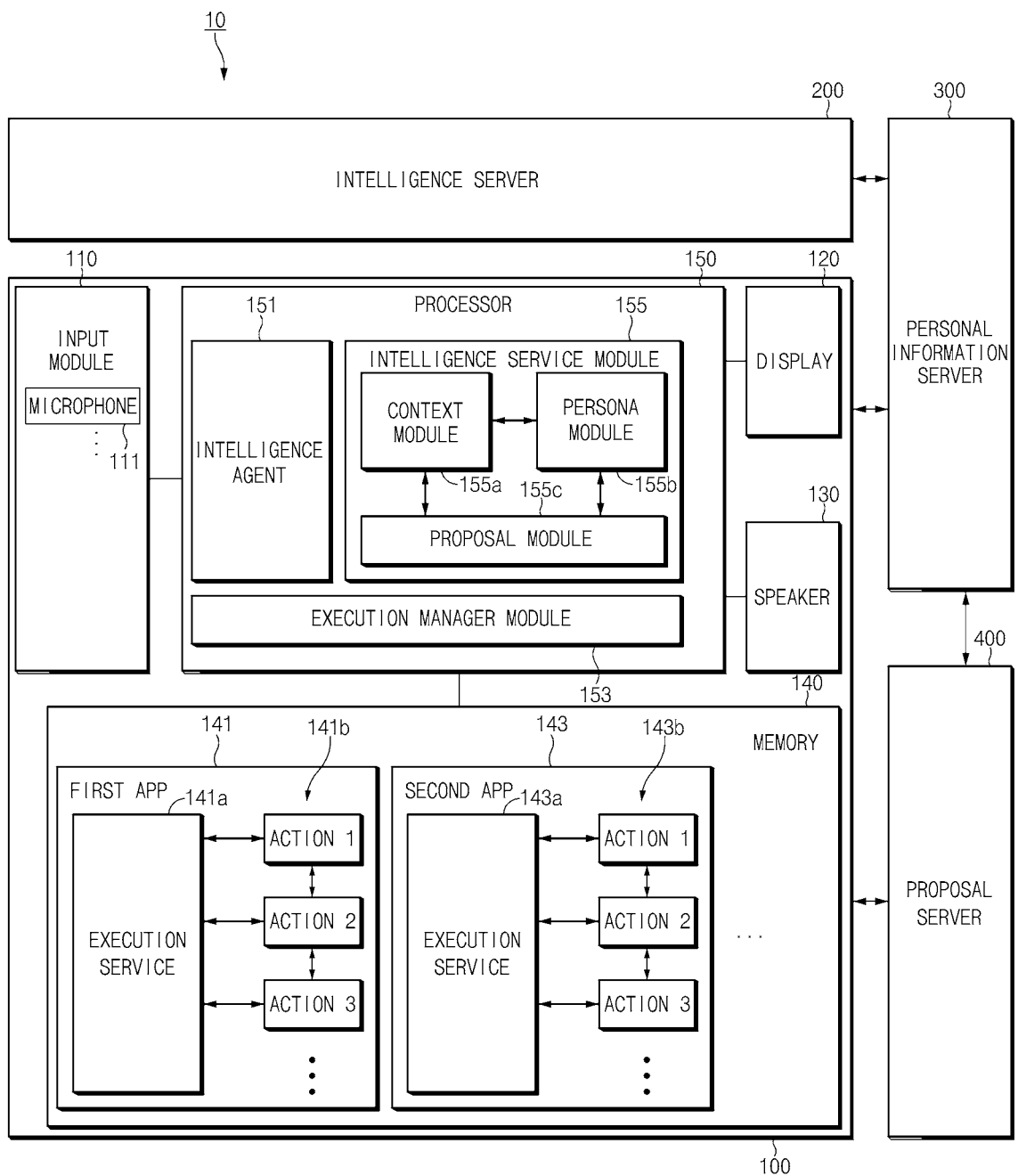
FIG. 2 is a block diagram illustrating a user terminal of an integrated intelligent system according to certain embodiments of the present disclosure.

FIG. 2 illustrates, in block diagram format, a user terminal of an integrated intelligent system, according to certain embodiments of the present disclosure.

Referring to the non-limiting example of FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing.

According to some embodiments, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to certain embodiments, the input module 110 may include a microphone (e.g., a microphone 111 of FIG. 3) that is capable of receiving user utterance as a voice signal. For example, the input module 110 may include a speech input system and may receive the utterance of the user as a voice signal through the speech input system.

According to various embodiments, the display 120 may display an image, a video, and/or an execution screen of an application. For example, the display 120 may display a graphic user interface (GUI) of an app.

According to some embodiments, the speaker 130 may output the voice signal. For example, the speaker 130 may output the voice signal generated in the user terminal 100 to the outside.

According to certain embodiments, the memory 140 may store a plurality of apps 141 and 143. The plurality of apps 141 and 143 stored in the memory 140 may be selected, launched, and executed depending on the user input.

According to some embodiments, the memory 140 may include a database capable of storing information necessary to recognize the user input. For example, the memory 140 may include a log database capable of storing log information. For another example, the memory 140 may include a persona database capable of storing user information.

According to some embodiments, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141*a* and 143*a* performing a function or a plurality of actions (or unit actions) 141*b* and 143*b*. The execution services 141*a* and 143*a* may be generated by the execution manager module 153 of the processor 150 and then may execute the plurality of actions 141*b* and 143*b*.

According to at least one embodiment, when the actions 141*b* and 143*b* of the apps 141 and 143 are executed, an execution state screen according to the execution of the actions 141*b* and 143*b* may be displayed in the display 120. For example, the execution state screen may be a screen in a state where the actions 141*b* and 143*b* are completed. For another example, the execution state screen may be a screen in a state where the execution of the actions 141*b* and 143*b* is in partial landing (e.g., in the case where a parameter necessary for the actions 141*b* and 143*b* are not input).

According to certain embodiments, the execution services 141*a* and 143*a* may execute the actions 141*b* and 143*b* depending on a path rule. For example, the execution services 141*a* and 143*a* may be activated by the execution manager module 153, may receive an execution request from the execution manager module 153 depending on the path rule, and may execute the actions 141*b* and 143*b* of the apps 141 and 143 depending on the execution request. If the execution of the actions 141*b* and 143*b* is completed, the execution services 141*a* and 143*a* may transmit completion information to the execution manager module 153.

According to at least one embodiment, in the case where the plurality of the actions 141*b* and 143*b* are respectively executed in the apps 141 and 143, the plurality of the actions 141*b* and 143*b* may be sequentially executed. If the execution of one action (action 1) is completed, the execution services 141*a* and 143*a* may open the next action (action 2) and may transmit completion information to the execution manager module 153. Here, it is understood that opening an arbitrary action is to change a state of the arbitrary action to an executable state or to prepare the execution of the arbitrary action. In other words, if the arbitrary action is not opened, the corresponding action may be not executed. If the completion information is received, the execution manager module 153 may transmit an execution request for the next actions 141*b* and 143*b* to an execution service (e.g., action 2). According to certain embodiments, in the case where the plurality of apps 141 and 143 are executed, the plurality of apps 141 and 143 may be sequentially executed. For example, if receiving the completion information after the execution of the last action of the first app 141 is executed, the execution manager module 153 may transmit the execution request of the first action of the second app 143 to the execution service 143*a*.

According to various embodiments, in the case where the plurality of the actions 141*b* and 143*b* are executed in the apps 141 and 143, a result screen according to the execution of each of the executed plurality of the actions 141*b* and 143*b* may be displayed in the display 120. According to an embodiment, only a part of a plurality of result screens according to the executed plurality of the actions 141*b* and 143*b* may be displayed in the display 120.

According to some embodiments, the memory 140 may store an intelligence app (e.g., a speech recognition app) operating in conjunction with an intelligence agent 151. The app operating in conjunction with the intelligence agent 151 may receive and process the utterance of the user as a voice signal. According to at least one embodiment, the app operating in conjunction with the intelligence agent 151 may be operated by a specific input (e.g., an input through a hardware key, an input through a touch screen, or a specific voice input) input through the input module 110.

According to some embodiments, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to various embodiments, the processor 150 may include the intelligence agent 151, the execution manager module 153, or an intelligence service module 155. In certain embodiments, the processor 150 may drive the intelligence agent 151, the execution manager module 153, or the intelligence service module 155 by executing instructions stored in the memory 140. Modules described in various embodiments of the present disclosure may be implemented by hardware or by software. In various embodiments of the present disclosure, it is understood that the action executed by the intelligence agent 151, the execution manager module 153, or the intelligence service module 155 is an action executed by the processor 150.

According to some embodiments, the intelligence agent 151 may generate an instruction for operating an app based on the voice signal received as the user input. According to some embodiments, the execution manager module 153 may receive the generated instruction from the intelligence agent 151, and may select, launch, and operate the apps 141 and 143 stored in the memory 140. According to certain embodiments, the intelligence service module 155 may manage information of the user and may use the information of the user to process the user input.

The intelligence agent 151 may transmit and process the user input received through the input module 110 to the intelligence server 200.

According to some embodiments, before transmitting the user input to the intelligence server 200, the intelligence agent 151 may pre-process the user input. According to certain embodiments, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to certain embodiments, the intelligence agent 151 may include all the pre-processing elements for performance. However, in another embodiment, the intelligence agent 151 may include a part of the pre-processing elements to operate at low power.

According to some embodiments, the intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. According to some embodiments, the wake up recognition module of the intelligence agent 151 may be implemented with a low-power processor (e.g., a processor included in an audio codec). According to certain embodiments, the intelligence agent 151 may be activated depending on the user input entered through a hardware key. In the case where the intelligence agent 151 is activated, an intelligence app (e.g., a speech recognition app) operating in conjunction with the intelligence agent 151 may be executed.

According to some embodiments, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to some embodiments, the speech recognition module for executing the user input of the intelligence agent 151 may be implemented in an app processor.

According to some embodiments, the speech recognition module (including the speech recognition module of a wake up module) of the intelligence agent 151 may recognize the user input by using an algorithm for recognizing a voice. For example, the algorithm for recognizing the voice may be at least one of a hidden markov model (HMM) algorithm, an artificial neural network (ANN) algorithm, or a dynamic time warping (DTW) algorithm.

According to certain embodiments, the intelligence agent 151 may change the voice input of the user to text data. According to some embodiments, the intelligence agent 151 may transmit the voice of the user to the intelligence server 200 to receive the changed text data. As such, the intelligence agent 151 may display the text data in the display 120.

According to certain embodiments, the intelligence agent 151 may receive a path rule from the intelligence server 200. According to some embodiments, the intelligence agent 151 may transmit the path rule to the execution manager module 153.

According to some embodiments, the intelligence agent 151 may transmit the execution result log according to the path rule received from the intelligence server 200 to the intelligence service module 155, and the transmitted execution result log may be accumulated and managed in preference information of the user of a persona module 155b.

According to certain embodiments, the execution manager module 153 may receive the path rule from the intelligence agent 151 to execute the apps 141 and 143 and may allow the apps 141 and 143 to execute the actions 141b and 143b included in the path rule. For example, the execution manager module 153 may transmit instruction information for executing the actions 141b and 143b to the apps 141 and 143 and may receive completion information of the actions 141b and 143b from the apps 141 and 143.

According to certain embodiments, the execution manager module 153 may transmit or receive the instruction information for executing the actions 141b and 143b of the apps 141 and 143 between the intelligence agent 151 and the apps 141 and 143. The execution manager module 153 may bind the apps 141 and 143 to be executed depending on the path rule and may transmit the instruction information of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to some embodiments, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing (e.g., in the case where a parameter necessary for the actions 141b and 143b are not input), the execution manager module 153 may transmit information about the partial landing to the intelligence agent 151. The intelligence agent 151 may make a request for an input of necessary information (e.g., parameter information) to the user by using the received information. For another example, in the case where the execution state of the actions 141b and 143b are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141b and 143b to a new parameter by using the received parameter information.

According to some embodiments, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to certain embodiments, the execution manager module 153 may receive a plurality of path rules. The execution manager module 153 may select a plurality of path rules based on the utterance of the user. For example, in the case where the user utterance specifies the app 141 executing a part of the action 141b but does not specify the app 143 executing any other action 143b, the execution manager module 153 may receive a plurality of different path rules in which the same app 141 (e.g., a gallery app) executing the part of the action 141b is executed and in which different apps 143 (e.g., a message app or a Telegram app) executing the other action 143b. For example, the execution manager module 153 may execute the same actions 141b and 143b (e.g., the same successive actions 141b and 143b) of the plurality of path rules. In the case where the execution manager module 153 executes the same action, the execution manager module 153 may display a state screen for selecting the different apps 141 and 143 included in the plurality of path rules in the display 120.

According to some embodiments, the intelligence service module 155 may include a context module 155a, a persona module 155b, or a proposal module 155c.

The context module 155a may collect current states of the apps 141 and 143 from the apps 141 and 143. For example, the context module 155a may receive context information indicating the current states of the apps 141 and 143 to collect the current states of the apps 141 and 143.

The persona module 155b may manage personal information of the user utilizing the user terminal 100. For example, the persona module 155b may collect the usage information and the execution result of the user terminal 100 to manage personal information of the user.

The proposal module 155c may predict the intent of the user to recommend an instruction to the user. For example, the proposal module 155c may recommend an instruction to the user in consideration of the current state (e.g., a time, a place, context, or an app) of the user.

Figure 3:
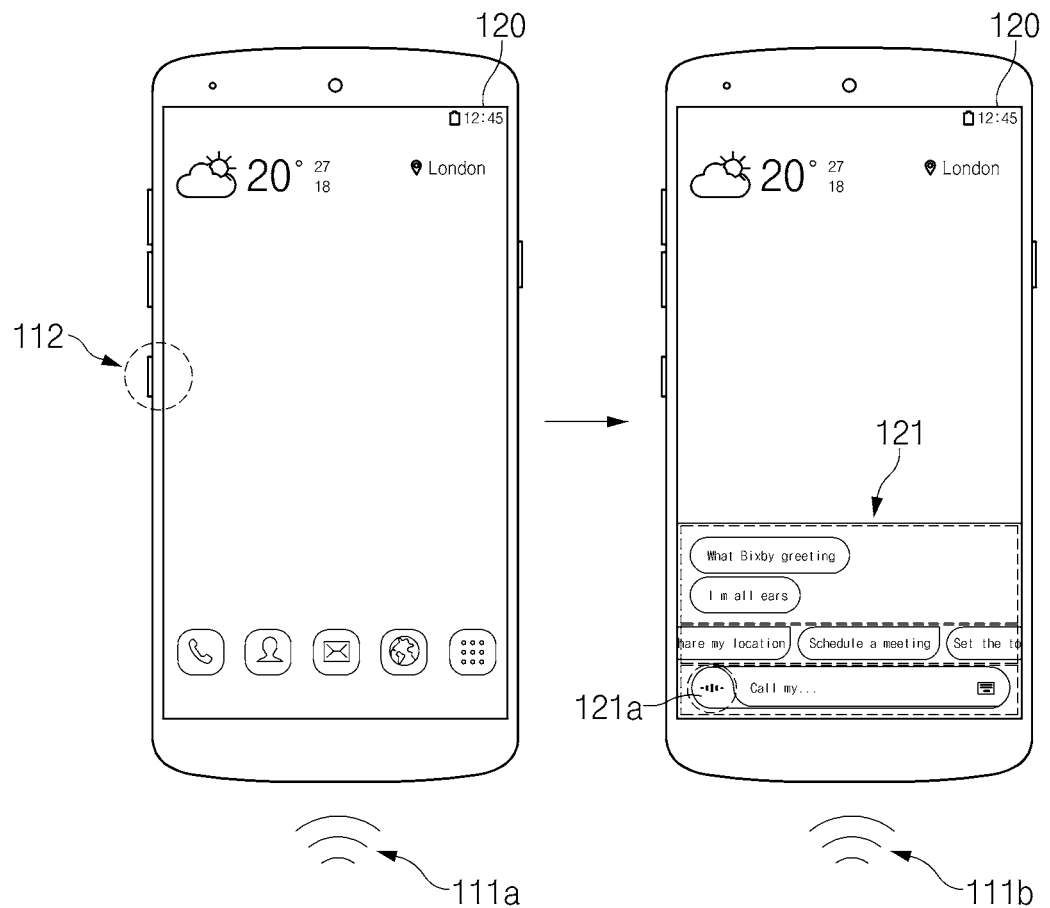
FIG. 3 illustrates an intelligence app of a user terminal is executed, according to certain embodiments of the present disclosure.

FIG. 3 illustrates an intelligence app of a user terminal executing according to some embodiments of the present disclosure.

The non-limiting example of FIG. 3 illustrates that the user terminal 100 receives a user input to execute an intelligence app (e.g., a speech recognition app) operating in conjunction with the intelligence agent 151.

According to certain embodiments, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121a of the UI 121 of the intelligence app for the purpose of entering a voice 113b in a state where the UI 121 of the intelligence app is displayed in the display 120. As another example, while continuously pressing the hardware key 112 to enter the voice 113b, the user may enter the voice 113b.

According to some embodiments, the user terminal 100 may execute the intelligence app for recognizing a voice through the microphone 111. For example, in the case where a specified vocal command (e.g., "wake up!") is entered 113a through the microphone 111, the user terminal 100 may display the UI 121 of the intelligence app in the display 120.

Figure 4:
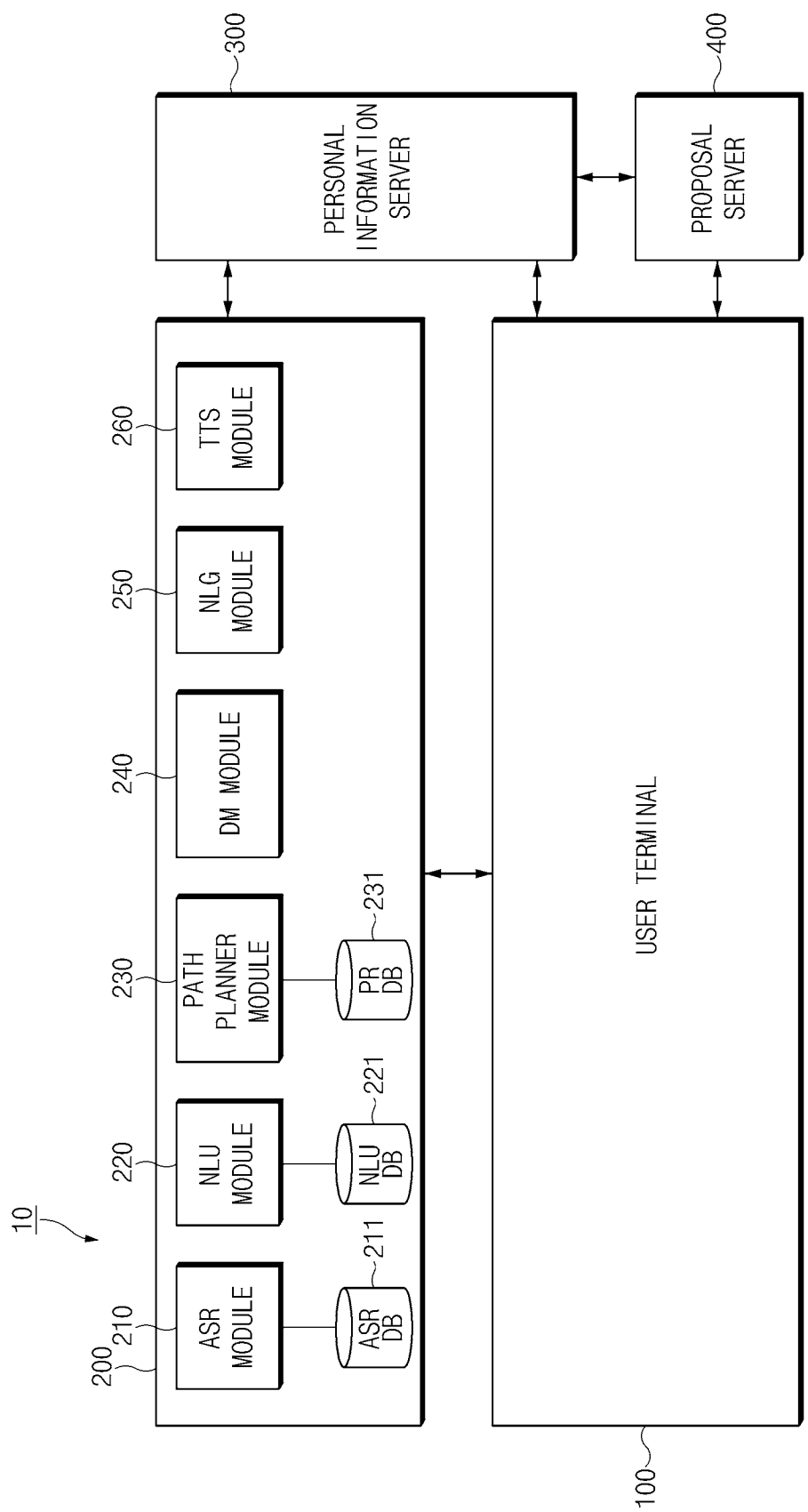
FIG. 4 illustrates, in block diagram format, an intelligence server of an integrated intelligent system, according to some embodiments of the present disclosure.

FIG. 4 illustrates, in block diagram format, an intelligence server of an integrated intelligent system, according to certain embodiments of the present disclosure.

Referring to the non-limiting example of FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to some embodiments, the ASR module 210 may change the user input received from the user terminal 100 to text data.

For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

According to certain embodiments, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to some embodiments, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to some embodiments, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to certain embodiments, the NLU module 220 may determine a parameter of the user input by using the words that are the basis for grasping the intent. According to some embodiments, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to certain embodiments, the ASR module 210 as well as the NLU module 220 may recognize the voice of the user with reference to the PLM stored in the NLU DB 221.

According to some embodiments, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to some embodiments, the path rule generated by the NLU module 220 may include information about the app to be executed, the action to be executed in the app, and a parameter necessary to execute the action.

According to some embodiments, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to certain embodiments, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to some embodiments, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to some embodiments, the path planner module 230 may select at least one path rule of the plurality of path rules.

According to certain embodiments, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to some embodiments, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to certain embodiments, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to some embodiments, the path planner module 230 may store the generated path rule in the PR DB 231.

According to some embodiments, the path planner module 230 may store the path rule generated by the NLU module 220 in the PR DB 231. The generated path rule may be added to the path rule set stored in the PR DB 231.

According to certain embodiments, the table stored in the PR DB 231 may include a plurality of path rules or a plurality of path rule sets. The plurality of path rules or the plurality of path rule sets may reflect the kind, version, type, or characteristic of a device performing each path rule.

According to some embodiments, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to certain embodiments, in the case where the user intent is not clear, the DM module 240 may perform a feedback for making a request for necessary information to the user. For example, the DM module 240 may perform a feedback for making a request for information about the parameter for grasping the user intent.

According to some embodiments, the DM module 240 may include a content provider module. In the case where the content provider module executes an action based on the intent and the parameter grasped by the NLU module 220, the content provider module may generate the result obtained by performing a task corresponding to the user input. According to some embodiments, the DM module 240 may transmit the result generated by the content provider module as the response to the user input to the user terminal 100.

According to certain embodiments, the natural language generating module NLG 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to some embodiments, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to some embodiments, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
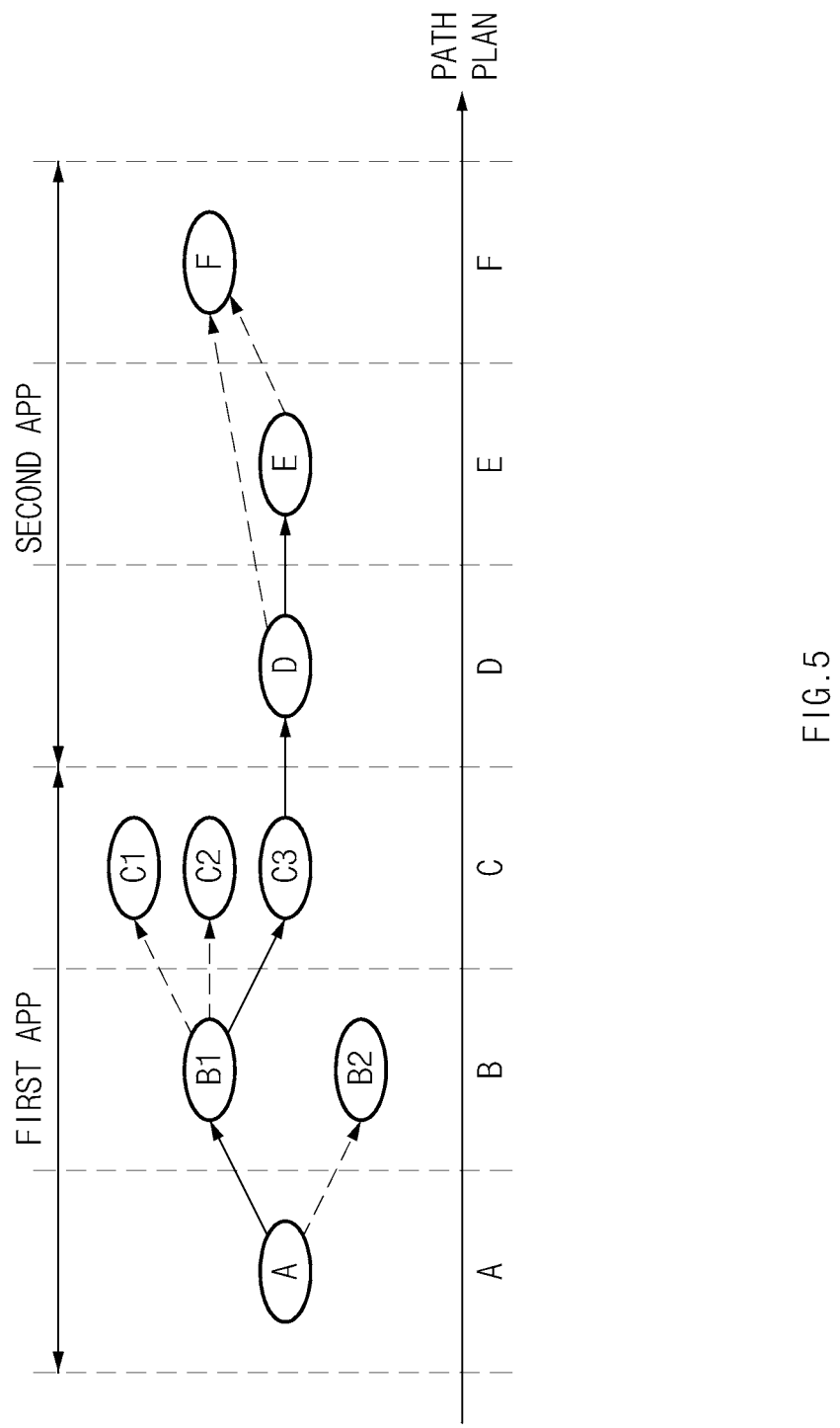
FIG. 5 illustrates a path rule generating method of a natural language understanding (NLU), according to certain embodiments of the present disclosure.

FIG. 5 is a diagram illustrating a path rule generating method of a path planner module, according to certain embodiments of the present disclosure.

Referring to FIG. 5, according to some embodiments, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to some embodiments, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to certain embodiments, the plurality of path rules implemented in a form of an ontology or a graph model may be stored in the PR DB 231.

According to some embodiments, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to some embodiments, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to certain embodiments, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to some embodiments, in the case where a user input in which information is insufficient is received by the intelligence server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. If the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to some embodiments, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligence server 200, the NLU module 220 may make a request for the missed information to receive an additional input or may determine a path rule corresponding to the user input by using user information.

Figure 6:
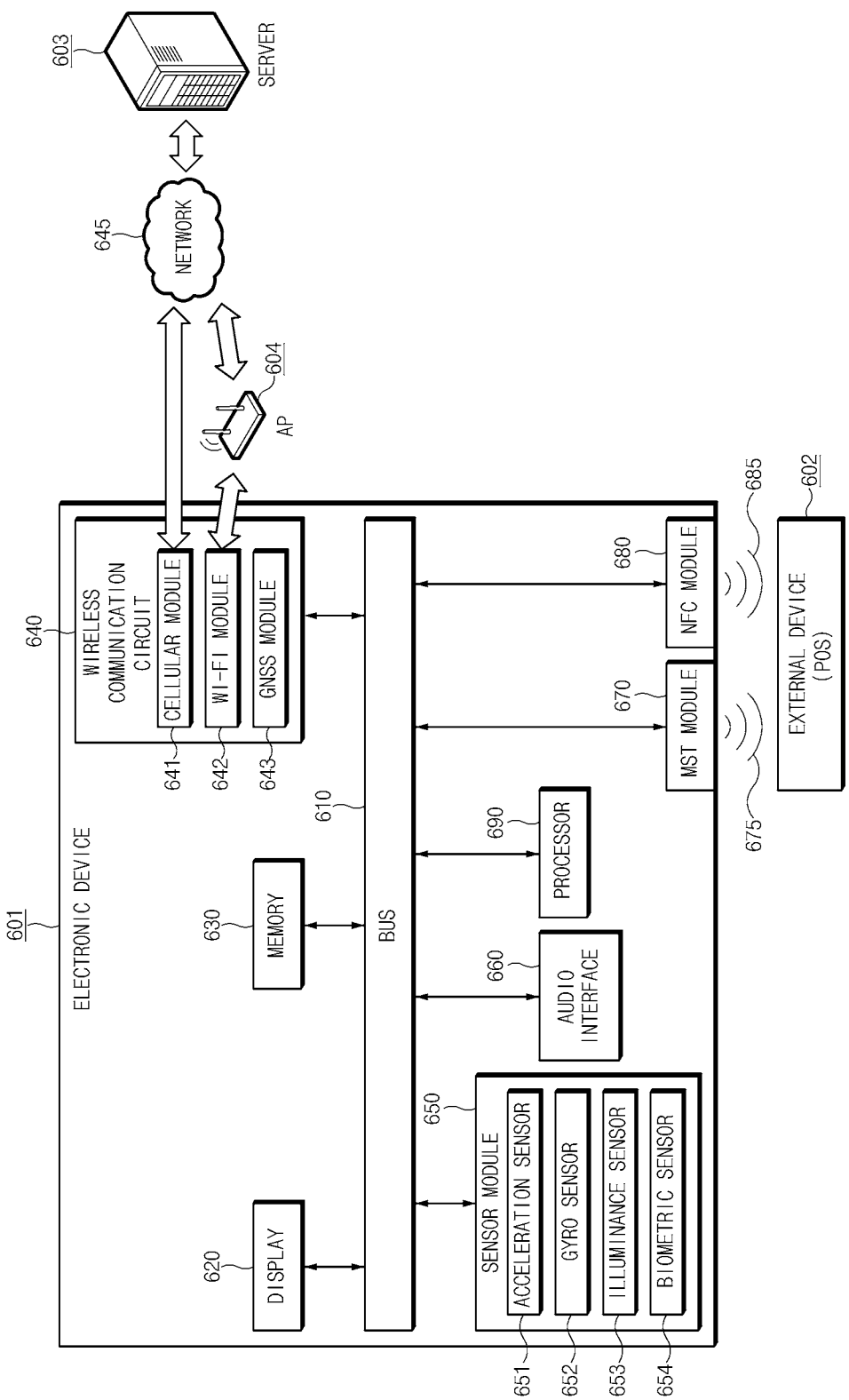
FIG. 6 illustrates, in block diagram format, an electronic device in a network environment, according to various embodiments.

FIG. 6 illustrates, in block diagram format, an electronic device, according to certain embodiments.

Referring to the non-limiting example of FIG. 6, an electronic device 601 according to some embodiments may make a payment and/or financial transactions with an external device 602 (e.g., a POS terminal installed in merchants, an automated teller machine (ATM) of a financial institution, an electronic device capable of personal-to-personal payment or personal-to-person remittance, or the like). The electronic device 601 may correspond to the user terminal 100 illustrated in FIG. 1.

According to some embodiments, for example, the electronic device 601 may include a bus 610, a display 620, a memory 630, a wireless communication circuit 640, a sensor module 650, an audio interface 660, an MST module 670, an NFC module 680, and/or a processor 690. According to various embodiments, the electronic device 601 may be implemented without some of the elements illustrated in FIG. 6 or may be implemented to further include one or more elements not illustrated in FIG. 6.

For example, the bus 610 may electrically interconnect the elements 620 to 690 of the electronic device 601. The bus 610 may include a circuit that transmits a communication message (e.g., a control message and/or data) between elements.

The display 620 may display various content (e.g., a text, an image, a video, an icon, an object, a symbol, or the like) under control of the processor 690. The display 620 may include a touch screen and may receive, for example, a touch, gesture, proximity, or hovering input using an electronic pen or a part of a user's body. The display 620 may output a graphic user interface (GUI) based on various types of software (e.g., a payment application or the like) and may obtain a user input through the GUI.

The memory 630 (e.g., the memory 140 of FIG. 2) may store commands, information, programs, or data that are associated with operations of the elements 620, and 640 to 690 included in the electronic device 601. For example, the memory 630 may store a payment application and data (e.g., information including payment data, a radiation pattern, information regarding correspondence(s) between the radiation pattern and the external device, or the like) necessary for the operation of the elements.

In addition, for example, the memory 630 may store instructions, when executed, that allow the processor 690 to perform various operations described in the present disclosure. After the instructions are implemented with, for example, software such as an application program, an operating system (OS), or firmware, the instructions may be stored in the memory 630 or may be embedded in hardware.

According to various embodiments, the memory 630 may be used to include a security module. The security module may store payment data. For example, the payment data may include at least one of a primary account number (PAN) in which at least a portion of the payment card is encrypted, an expiration date, a card verification value (CVV), or a token, at least a part of which is encrypted.

According to certain embodiments, the security module may be implemented with, for example, a secure element (SE), an embedded SE (eSE), a universal IC card (UICC), an embedded UICC (eUICC), a micro secure digital (SD) card, a subscriber identifier module (SIM) card, a Trust zone being storage (or memory) safely protected from an unauthorized access, or the like.

The wireless communication circuit 640 may establish communication with a mobile payment service server 603, a server involved in other payment transactions, or the like. For example, the wireless communication circuit 640 may include a cellular module 641, a wireless-fidelity (Wi-Fi) module 642, and a global navigation satellite system (GNSS) module 643.

The cellular module 641 may access a network 645 based on a cellular communication protocol such as LTE, LTE-A, CDMA, and GSM. The Wi-Fi module 642 may access an access point (AP) 604 at a periphery of the electronic device 601 so as to access the network 645. The electronic device 601 may communicate with a mobile payment service server 603, a server involved in other payment transactions, or the like by using the cellular module 641 and/or the Wi-Fi module 642. The GNSS module 643 may obtain location information (e.g., latitude and longitude) of the electronic device 601 from the corresponding satellite. According to various embodiments, the electronic device 601 may obtain (or estimate) location information through triangulation using signals of base stations accessed via the cellular module 641 or location information of the AP 604 connected to the Wi-Fi module 642.

The sensor module 650 may measure or sense a physical quantity obtained in the electronic device 601 or in an ambient environment of the electronic device 601 and may convert the physical quantity into an electrical signal. According to some embodiments, the sensor module 650 may include an acceleration sensor 651 (or an accelerometer), a gyro sensor 652 (or gyroscope sensor), an illuminance sensor 653, and a biometric sensor 654. According to various embodiments, the sensor module 650 may further include various sensor modules.

The gyro sensor 652 may sense the posture of the electronic device 601, and the acceleration sensor 651 may detect an acceleration at which the electronic device 601 moves. For example, the gyro sensor 652 and/or the acceleration sensor 651 may detect in what posture the electronic device 601 is placed on a three-dimensional space and/or in which direction the electronic device 601 has been moved on a three-dimensional space by external force.

The illuminance sensor 653 may sense the amount of light at a periphery of the electronic device 601. For example, the illuminance sensor 653 may be implemented with a photo resistor (e.g., a cadmium sulfide cell) in which a resistance value varies with the amount of light. The processor 690 may be provided with information about illuminance (or the amount of light) around the electronic device 601 based on a resistance value varying in the photo resistor of the illuminance sensor 653.

The biometric sensor 654 may detect or receive a biometric feature originated from a user's body. For example, the biometric sensor 654 may convert the detected biometric feature into a digital value, and may provide the converted digital value to the processor 690. The processor 690 may compare the converted digital value and an authentication value enrolled in the memory 630. The processor 690 may authenticate a bona fide user based on the comparison result. According to various embodiments, the comparison and user authentication may be made by using a computing resource of a driver IC embedded in the biometric sensor 654. According to certain embodiments, the biometric sensor 654 may include a sensor such as a fingerprint sensor, an iris sensor, or a vein sensor. According to some embodiments, the biometric sensor 654 may be integrated in a display.

The audio interface 660 may convert, for example, a sound and an electrical signal in dual directions. According to some embodiments, the audio interface 660 may obtain a sound through an input device (e.g., a microphone) or may output a sound through an output device (not illustrated) (e.g., a speaker or a receiver) included in the electronic device 601 or an external electronic device (e.g., a speaker or a headphone) connected to the electronic device 601.

The MST module 670 may radiate a magnetic pulse 675 corresponding to the payment data in a specified radiation pattern. For example, the MST module 670 may include an MST controller (or an MST driver) and an inductor driven by the MST controller. The MST controller may convert the payment data into an electrical signal and may transmit the converted electrical signal to the inductor. The inductor may generate magnetic field fluctuations (e.g., magnetic pulses) modulated in a specified radiation pattern based on the electrical signal received from the MST controller, and may transmit the payment data to the external device 602 through the magnetic pulse 675.

The MST module 670 is illustrated in FIG. 6 as being embedded in the electronic device 601. However, according to various embodiments, the MST module 670 may be implemented with a dedicated device (or accessory) and may be electrically coupled with the electronic device 601 through a specified interface (e.g., a 3.5 mm earphone terminal, a USB receptacle, or the like).

The NFC module 680 may be a module supporting a near field communication (NFC) communication function. For example, the NFC module 680 may be activated under control of the processor 690. If receiving a specified signal from the outside, the NFC module 680 may transmit the specified signal corresponding to the received signal to the outside. In this operation, the NFC module 680 may transmit payment information stored in a security module to an external device under control of the processor 690. After transmitting the payment information, the NFC module 680 may receive a message of payment completion from the external device.

For example, the processor 690 (e.g., the processor 150) may be electrically connected with the elements 610 to 680 included in the electronic device 601, through the bus 610 and may execute operations or data processing associated with control and/or communication of the elements 610 to 680 included in the electronic device 601.

According to certain embodiments, the processor 690 may execute or launch a payment application (for example, "Samsung Pay™" or the like). The specified execution screen (a specific activity screen according to the execution of an application), that is, a GUI screen may be output in the display 620 in response to the execution of the payment application.

After executing the payment application, the processor 690 may collect information associated with the external device 602 and/or a radiation pattern used to make a payment with the external device 602, depending on the action described below.

According to some embodiments, the processor 690 may receive a user input (e.g., the selection of a payment card) associated with the GUI screen of a payment application and may perform user authentication (e.g., user authentication using the biometric sensor 654, or the like). If the user authentication is successful, the processor 690 may radiate a magnetic pulse corresponding to payment data depending on one radiation pattern among a plurality of radiation patterns stored in the memory 630.

Figure 7:
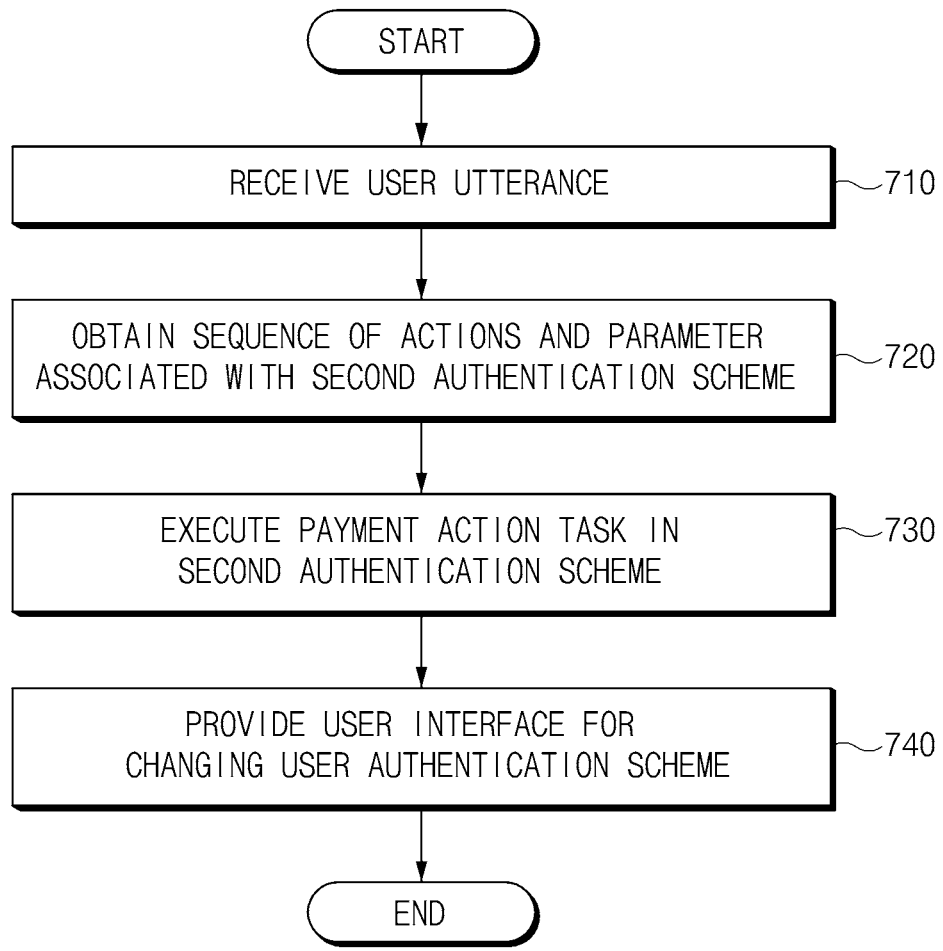
FIG. 7 illustrates operations of a method of making a payment in an authentication scheme according to user utterance, according to at least one embodiment.

FIG. 7 illustrates operations of a method of making a payment in an authentication scheme according to user utterance, according to certain embodiments.

In some embodiments, the electronic device 601 of FIG. 6 performs operations shown with reference to FIG. 7.

In some embodiments given with reference to FIG. 7, the memory 630 of the electronic device 601 may store a payment application, the user authentication scheme (or default authentication scheme) of which is set to a first authentication scheme.

In certain embodiments, the first authentication scheme may be an authentication scheme currently set in the payment application. For example, in the case where the authentication scheme of the payment application is set to a fingerprint authentication scheme by a user, the first authentication scheme may be the fingerprint authentication scheme.

In some embodiments, before performing operation 710, the processor 690 may receive, from the user, an input to set the user authentication scheme to the first authentication scheme. The processor 690 may set the first authentication scheme as the user authentication scheme of the payment application based on the received input.

Referring to the non-limiting example of FIG. 7, in operation 710, the processor 690 may receive the user utterance by using the audio interface 660.

In some embodiments, the user utterance may indicate a payment action task using a second authentication scheme. In certain embodiments, the second authentication scheme may be an authentication scheme included in the user utterance or an authentication scheme used to request a payment through the user utterance.

In certain embodiments, the user utterance may indicate a payment action task using the second authentication scheme different from the first authentication scheme set in the payment application. For example, the user utterance may include information about the second authentication scheme different from the first authentication scheme and a payment request. For example, the user authentication scheme set in the payment application may be a PIN authentication scheme, and the user utterance may be "please make a payment in a fingerprint authentication scheme." The user utterance may indicate a payment action task using the fingerprint authentication scheme different from the PIN authentication scheme.

In some embodiments, each of the first authentication scheme and the second authentication scheme may be an authentication scheme associated with at least one of the touch screen display 620, the biometric sensor 654, or the audio interface 660. For example, the authentication scheme associated with the touch screen display 620 may include at least one of a pattern authentication scheme or a PIN authentication scheme. The authentication scheme associated with the biometric sensor 654 may include at least one of a fingerprint authentication scheme, an iris authentication scheme, a facial recognition authentication, a retina authentication scheme, or a heartbeat authentication scheme. The authentication scheme associated with the audio interface 660 may include a voice authentication scheme.

In certain embodiments, the user utterance may further indicate a payment means for making a payment. For example, the user utterance may include information about the payment means and a payment request. In some embodiments, the payment means may include at least one of a type of a payment card, a payment card issuer, or a payment card name. For example, the user utterance may be "make a payment by using Samsung card". The user utterance may indicate a payment action task using the Samsung card.

In operation 720, the processor 690 may obtain the sequence (or the order of states) of actions of an electronic device for executing a task and a necessary parameter, from the user utterance. In some embodiments, the obtained parameter may be a parameter necessary to execute actions. For example, the parameter may include a parameter associated with the second authentication scheme.

In some embodiments, the processor 690 may transmit data associated with the user utterance to an external server through the wireless communication circuit 640. In certain embodiments, the external server may be the intelligence server 200. The intelligence server 200 may generate the sequence of actions and a parameter associated with the second authentication scheme, based on the data associated with the user utterance and may transmit the sequence of actions and the parameter to an electronic device. The processor 690 may receive the response generated based on the data associated with the user utterance, from the external server through the wireless communication circuit 640 and may obtain the sequence of actions of the electronic device and the parameter associated with the second authentication scheme, from the received response.

In some embodiments, the processor 690 may extract the sequence of actions of the electronic device and a parameter associated with the second authentication scheme, from the user utterance. The processor 690 may analyze the received user utterance and may extract the sequence of actions of the electronic device and a parameter associated with the second authentication scheme.

In certain embodiments, in the case where the user utterance further indicates a payment means for making a payment, the processor 690 may further obtain a parameter associated with the payment means, from the user utterance. For example, in the case where the user utterance is "make a payment by using Samsung card", the processor 690 may obtain a parameter associated with the Samsung card.

In various embodiments, the processor 690 may support a voice authentication scheme. According to various embodiments, when receiving a user utterance indicating a payment action task, the processor 690 may provide settings for using a voice authentication scheme. According to various embodiments, in the case where the use of a voice authentication scheme is activated and the user utterance does not include information about an authentication scheme, the processor 690 may perform voice authentication by using the received user utterance.

In various embodiments, in the case where the processor 690 supports a voice authentication scheme and the user utterance does not include information about an authentication scheme, the processor 690 may perform voice authentication by using the received user utterance.

According to various embodiments, when an external server (e.g., the server 603) or the processor 690 generates the sequence of actions for executing a payment action task and a parameter from the user utterance not including information about an authentication scheme, the external server or the processor 690 may generate the sequence of actions for performing a payment action task including voice authentication and a parameter.

According to various embodiments, the processor 690 may obtain the sequence of actions for executing a payment action task by using a voice authentication scheme and the parameter and may perform voice authentication. The processor 690 may compare voice data, which corresponds to the user utterance and which is used as authentication data, with authentication reference data (e.g., a voice print, a voice template, a voice model, or the like) to perform voice authentication.

According to various embodiments, the processor 690 may perform voice authentication. However, in the case where the voice authentication fails, the processor 690 may perform authentication in the first authentication scheme set in the payment application.

In operation 730, the processor 690 may execute a payment action task depending on the sequence of the obtained actions by using an electronic device in the second authentication scheme. According to some embodiments, in the case where the information about the authentication scheme is not included in the received user utterance, the second authentication scheme may be a voice authentication scheme.

In certain embodiments, the processor 690 may execute a payment action task by using a short range communication circuit. According to some embodiments, the short range communication circuit may include at least one of the MST module 670 or the NFC module 680.

In certain embodiments, in the case where the user utterance further indicates a payment means for making a payment, the processor 690 may execute a payment action task by using card information corresponding to the parameter associated with the payment means. For example, in the case where the user utterance is "make a payment by using Samsung card", the processor 690 may execute a payment action task by using the card information (e.g., 'Samsung card 1' card) corresponding to a parameter associated with the Samsung card.

In various embodiments, in the case where the user utterance indicates a payment action task using the same authentication scheme as the first authentication scheme set in the payment application, the processor 690 may execute the payment action task in the first authentication scheme.

In operation 740, the processor 690 may provide a user with a user interface for changing the user authentication scheme to the second authentication scheme.

In some embodiments, after completing the execution of a task, the processor 690 may compare the second authentication scheme with the first authentication scheme and may provide a user with a user interface based at least partly on the comparison result. For example, in the case where the first authentication scheme is the same as the second authentication scheme, the processor 690 may not provide a user interface for changing the user authentication scheme. In the case where the first authentication scheme is different from the second authentication scheme, the processor 690 may provide a user interface for changing the user authentication scheme.

In certain embodiments, the processor 690 may provide a user with the user interface by using at least one of the touch screen display 620 or the audio interface 660. For example, the processor 690 may display a message saying that "Do you want to change the user authentication scheme to a fingerprint authentication scheme?" through the touch screen display 620 and may obtain an input to determine whether to change. For example, the processor 690 may output a voice signal saying that "Do you want to change the user authentication scheme to a fingerprint authentication scheme?" through the audio interface 660 and may obtain an input to determine whether to change.

After operation 740, the processor 690 may change the user authentication scheme to the second authentication scheme based on a user input through the provided user interface.

For example, in embodiments where the first authentication scheme set as the user authentication scheme of the payment application is an iris authentication scheme and the second authentication scheme is a fingerprint authentication scheme, in operation 740, the processor 690 may provide a user interface for changing the user authentication scheme to the fingerprint authentication scheme. In the case where the processor 690 obtains the user input to change the user authentication scheme to the fingerprint authentication scheme through a user interface, the processor 690 may change the user authentication scheme to the fingerprint authentication scheme. In the case where the processor 690 does not obtain a user input to change the user authentication scheme to the fingerprint authentication scheme through the user interface or in the case where the processor 690 obtains a user input not to change the user authentication scheme to the fingerprint authentication scheme through the user interface, the processor 690 may not change the user authentication scheme.

However, some embodiments of operation 710 to operation 740 will be described in further detail with reference to FIGS. 8 to 11.

Figure 8:
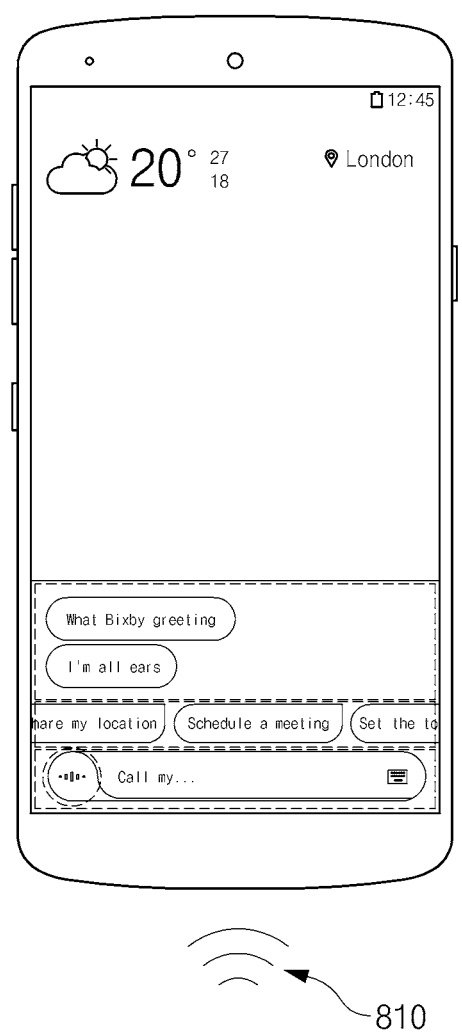
FIG. 8 illustrates an electronic device illustrates a user utterance via an audio interface, according to certain embodiments.
Figure 9:
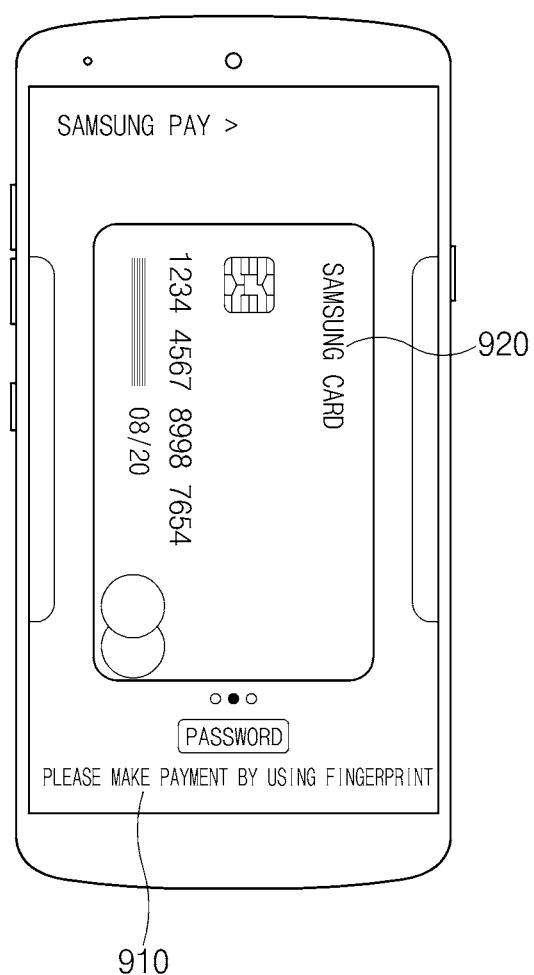
FIG. 9 illustrates an electronic device executing a payment action task using a fingerprint authentication scheme, according to certain embodiments.
Figure 10:
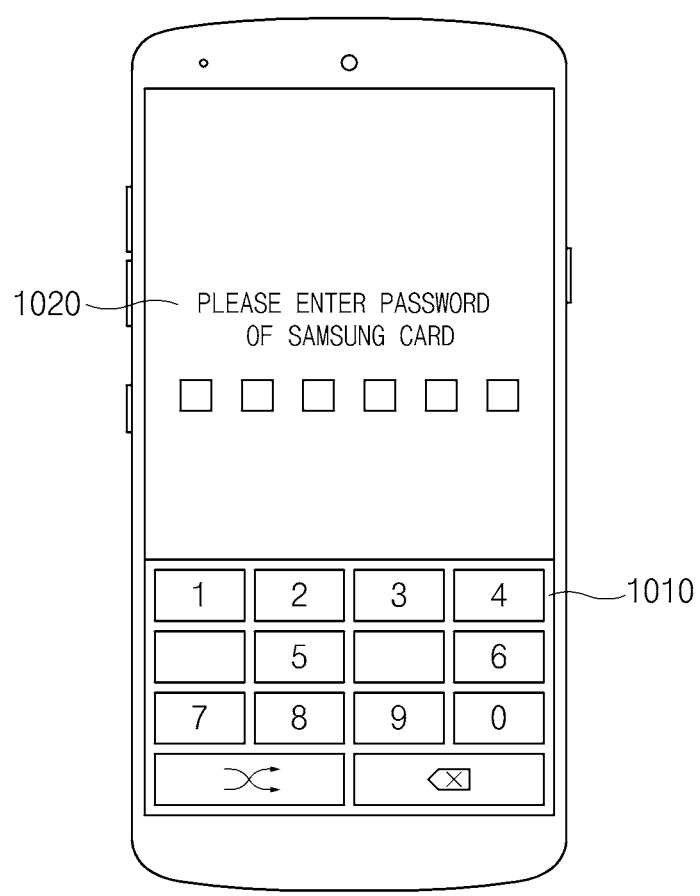
FIG. 10 illustrates an electronic device executing a payment action task using a PIN authentication scheme, according to various embodiments.
Figure 11:
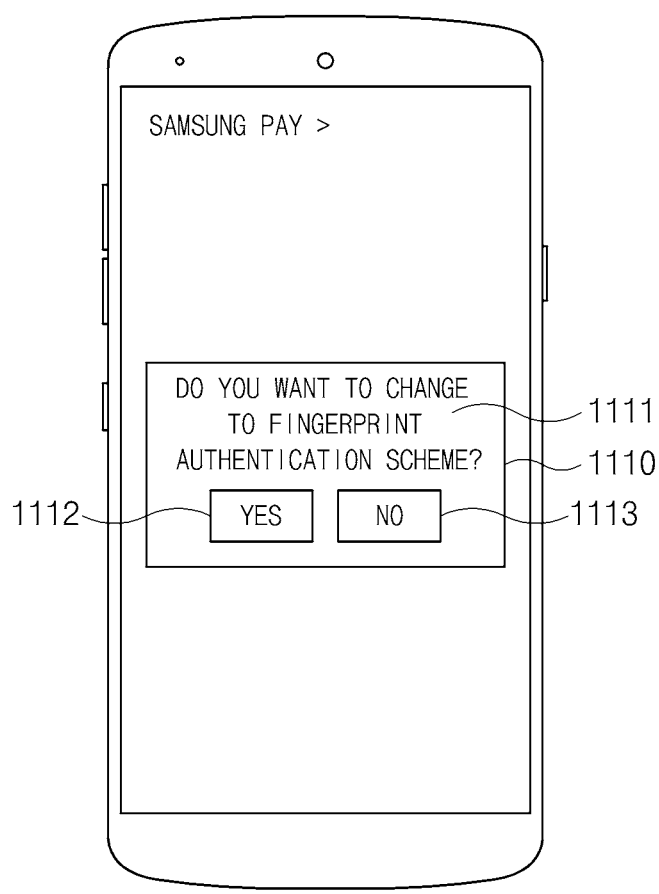
FIG. 11 illustrates an electronic device displaying a user interface for changing a user authentication scheme according to some embodiments.

FIG. 8 illustrates an electronic device (e.g., the electronic device 601 of FIG. 6) receiving a user utterance via the audio interface 660, according to certain embodiments. FIG. 9 illustrates an electronic device executing a payment action task using a fingerprint authentication scheme, according to some embodiments. FIG. 10 illustrates an electronic device executing a payment action task using a PIN authentication scheme, according to some embodiments. FIG. 11 illustrates an electronic device displaying a user interface for changing a user authentication scheme, according to certain embodiments.

In these non-limiting examples, it may be assumed that a first authentication scheme being a user authentication scheme set in a payment application is a PIN authentication scheme.

Referring to the non-limiting example of FIG. 8, in operation 710 of FIG. 7, the processor 690 may receive a user utterance 810 through the audio interface 660 in a state where an intelligence agent is activated. In some embodiments, the user utterance may be "make a payment by using the Samsung card with the fingerprint authentication scheme". The user utterance indicates the fingerprint authentication scheme and a payment action task using the Samsung card.

In operation 720 of FIG. 7, the processor 690 may obtain the sequence of actions of the electronic device for executing a task, the parameter associated with the fingerprint authentication scheme, and a parameter associated with the Samsung card from the user utterance. In some embodiments, the processor 690 may transmit data associated with the user utterance to an intelligence server (e.g., the intelligence server 200 of FIG. 1) by using the wireless communication circuit 640 and may obtain the sequence of actions and a parameter from the intelligence server 200.

In operation 730 of FIG. 7, the processor 690 may execute a payment action task depending on the sequence of the obtained actions in a fingerprint authentication scheme by using card information corresponding to a parameter associated with Samsung card.

In certain embodiments, referring to FIG. 9, the processor 690 may execute a payment action task in a fingerprint authentication scheme 910 by using card information 920 corresponding to the parameter associated with the Samsung card.

In various embodiments, in the case where the user utterance received in operation 710 is "make a payment by using Samsung card", in operation 720, the processor 690 may obtain the sequence of actions of the electronic device and the parameter associated with Samsung card. Referring to FIG. 10, in operation 730, the processor 690 may execute a payment action task in a PIN authentication scheme 1010 being the first authentication scheme set in the payment application, by using card information 1020 corresponding to the parameter associated with the Samsung card.

Referring to the non-limiting example of FIG. 11, in operation 740 of FIG. 7, the processor 690 may provide a user interface 1110 for changing the user authentication scheme to the fingerprint authentication scheme, in the touch screen display 620. In some embodiments, the user interface 1110 may include a message 1111 associated with the authentication scheme to be changed. In some embodiments, in the case where the processor 690 obtains an input 1112 to change the user authentication scheme, the processor 690 may change the user authentication scheme, which is set in the payment application, to the fingerprint authentication scheme. In certain embodiments, in the case where the processor 690 obtains a touch input 1113 to change the user authentication scheme, the processor 690 may maintain the user authentication scheme, which is set in the payment application, to the PIN authentication scheme.

Figure 12:
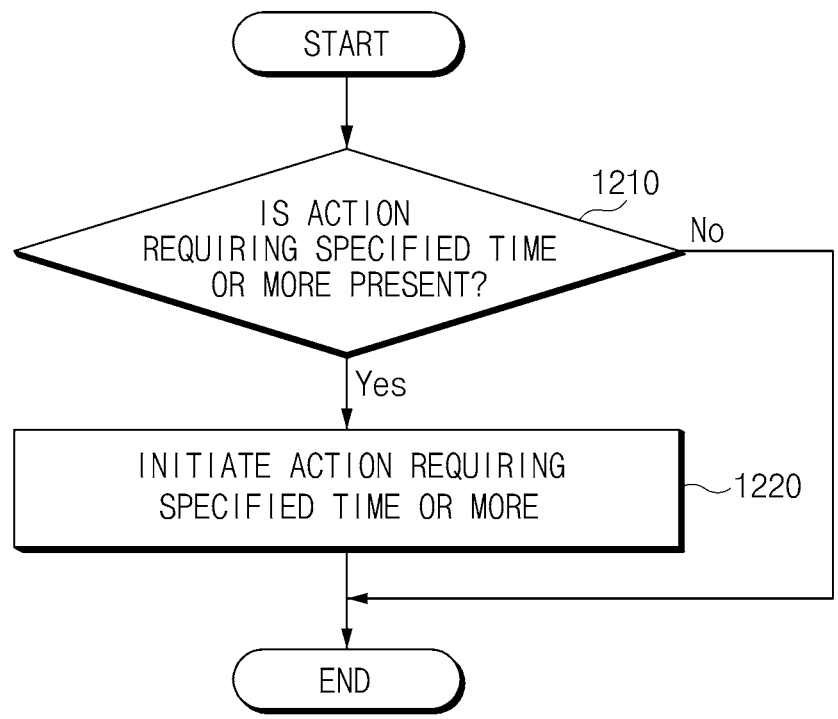
FIG. 12 illustrates aspects of operations of a method according to certain embodiments of this disclosure.

FIG. 12 illustrates aspects of a method according to some embodiments.

In certain embodiments, operation 1210 and operation 1220 may be performed between operation 720 and operation 730.

In operation 1210, the processor 690 may determine whether an action requiring a specified time or more is present in a payment action task.

For example, the processor 690 may determine whether an authentication scheme is a biometric authentication scheme (e.g., a fingerprint authentication scheme, an iris authentication scheme, a facial recognition authentication, a retina authentication scheme, a heartbeat authentication scheme, or the like) that needs to call an external server. For another example, the processor 690 may determine whether an action of generating payment data (e.g., a token) is present in a payment action task.

In some embodiments, the processor 690 may receive data associated with the result in which an intelligence server (e.g., the intelligence server 200 of FIG. 1) determines whether the action requiring a specified time or more is present in the payment action task. According to some embodiments, the processor 690 may determine whether the action requiring a specified time or more is present, by using data received from the intelligence server.

In certain embodiments, the memory 630 may store a list of actions requiring a specified time or more. The processor 690 may determine whether an action included in the list is present in the payment action task to determine whether the action requiring a specified time or more is present.

In operation 1220, the processor 690 may initiate the action requiring a specified time or more.

In some embodiments, the processor 690 may initiate the action requiring a specified time or more prior to other action(s) included in the payment action task.

For example, in the case where an authentication scheme is the biometric authentication scheme, before operation 730, the processor 690 may call an external server, which performs authentication in the biometric authentication scheme, by using the wireless communication circuit 640. For example, the external server may include a fast identity online (FIDO) server.

For another example, in the case where an action of generating payment data is present in the payment action task, the processor 690 may perform a preparatory action for generating the payment data.

According to some embodiments, before executing the payment action task (e.g., the operation 730 of FIG. 7), a time required to execute the payment action task may be reduced by calling the external server for biometric authentication or by performing the preparatory action for generating the payment data.

Figure 13:
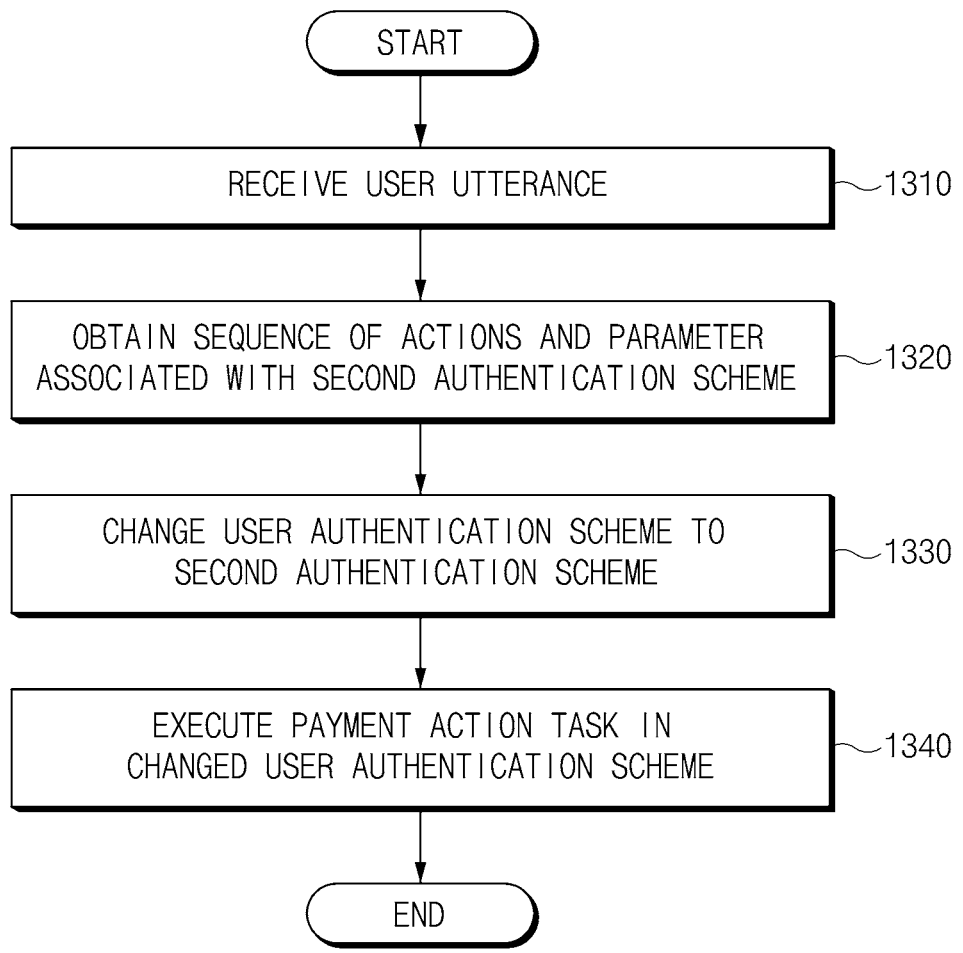
FIG. 13 is a flowchart illustrates operations of a method for making a payment based on a user utterance, according to various embodiments.

FIG. 13 illustrates operations of a method of making a payment based on a user utterance, according to various embodiments.

Hereinafter, it is assumed that the electronic device 601 of FIG. 6 performs a process of FIG. 13. In addition, as described in the non-limiting example of FIG. 13, it is understood that the operation described as being executed by the electronic device 601 is controlled by the processor 690 of the electronic device 601.

In certain embodiments given with reference to FIG. 13, the memory 630 of the electronic device 601 may store a payment application, the user authentication scheme (or default authentication scheme) of which is set to a first authentication scheme. In some embodiments, before performing operation 1310, the processor 690 may receive, from the user, an input to set the user authentication scheme to the first authentication scheme. The processor 690 may set the first authentication scheme as the user authentication scheme of the payment application based on the received input.

In some embodiments, each of the first authentication scheme and the second authentication scheme may be an authentication scheme associated with at least one of the touch screen display 620, the biometric sensor 654, or the audio interface 660. For example, the authentication scheme associated with the touch screen display 620 may include at least one of a pattern authentication scheme or a PIN authentication scheme. The authentication scheme associated with the biometric sensor 654 may include at least one of a fingerprint authentication scheme or an iris authentication scheme. The authentication scheme associated with the audio interface 660 may include a voice authentication scheme.

In operation 1310, the processor 690 may receive the user utterance by using the audio interface 660. In certain embodiments, the user utterance may indicate a payment action task using the second authentication scheme different from the first authentication scheme set in the payment application. According to various embodiments, operation 1310 may correspond to operation 710.

In operation 1320, the processor 690 may obtain, from a user utterance, the sequence of actions of the electronic device for executing the task and a parameter associated with the second authentication scheme. According to various embodiments, operation 1320 may correspond to operation 720.

In operation 1330, the processor 690 may change the user authentication scheme to the second authentication scheme. In certain embodiments, the processor 690 may change the user authentication scheme set in a payment application to the second authentication scheme. In various embodiments, the payment application may include an activity for a screen for changing the user authentication scheme. The processor 690 may change the user authentication scheme to the second authentication scheme without executing the activity.

In operation 1340, the processor 690 may execute the payment action task depending on the sequence of the obtained actions, by using an electronic device in the changed user authentication scheme. In certain embodiments, since the user authentication scheme is changed to the second authentication scheme, the processor 690 may execute the payment action task in the second authentication scheme.

After operation 1340, the processor 690 may provide a user with a user interface for maintaining the changed user authentication scheme or for changing the user authentication scheme to the first authentication scheme. In various embodiments, a separate authentication procedure is required for the processor 690 to change the user authentication scheme to the second authentication scheme. However, if payment authentication is successful, the processor 690 may change the user authentication scheme to the second authentication scheme without require a separate authentication procedure.

Figure 14:
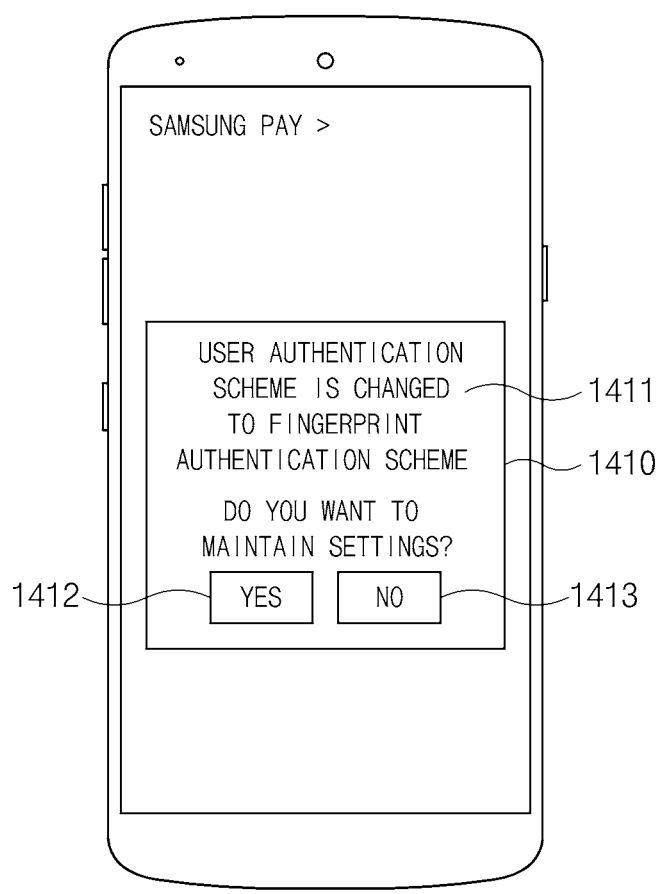
FIG. 14 illustrates an electronic device that displays a user interface for maintaining a changed user authentication scheme or for changing a user authentication scheme to a first authentication scheme, according to various embodiments.

FIG. 14 illustrates an electronic device (e.g., the electronic device 601 of FIG. 6) which displays a user interface for maintaining a changed user authentication scheme or for changing a user authentication scheme to a first authentication scheme, according to various embodiments.

In certain embodiments of FIG. 14, before operation 1310 is performed, it can be assumed that the first authentication scheme being the user authentication scheme set in a payment application is a PIN authentication scheme.

According to various embodiments, referring to FIG. 14, a processor (e.g., the processor 690 of FIG. 6) may provide a user interface 1410 for maintaining the changed user authentication scheme, for example, a fingerprint authentication scheme or for changing the user authentication scheme to the first authentication scheme, for example, the PIN authentication scheme. In various embodiments, the user interface 1410 may include a message 1411 associated with the changed user authentication scheme and a query of whether to maintain a setting change. In certain embodiments, in the case where the processor 690 obtains an input 1412 to maintain the setting change, the processor 690 may maintain the user authentication scheme changed to the fingerprint authentication scheme. In various embodiments, in the case where the processor 690 obtains an input 1413 not to maintain the setting change, the processor 690 may change the user authentication scheme set in the payment application to the PIN authentication scheme being the original authentication scheme.

Hereinafter, various embodiments to make a payment by using a payment means according to a voice input will be described.

Hereinafter, it is assumed that the user terminal 100 of FIG. 1 (e.g., the electronic device 601 of FIG. 6) and the intelligence server 200 perform the process illustrated with respect to FIGS. 15 to 17. In addition, as described in FIGS. 15 to 17, it is understood that the operation described as being executed by the user terminal 100 is controlled by the processor 150 (e.g., the processor 690 of FIG. 6) of user terminal 100.

Figure 15:
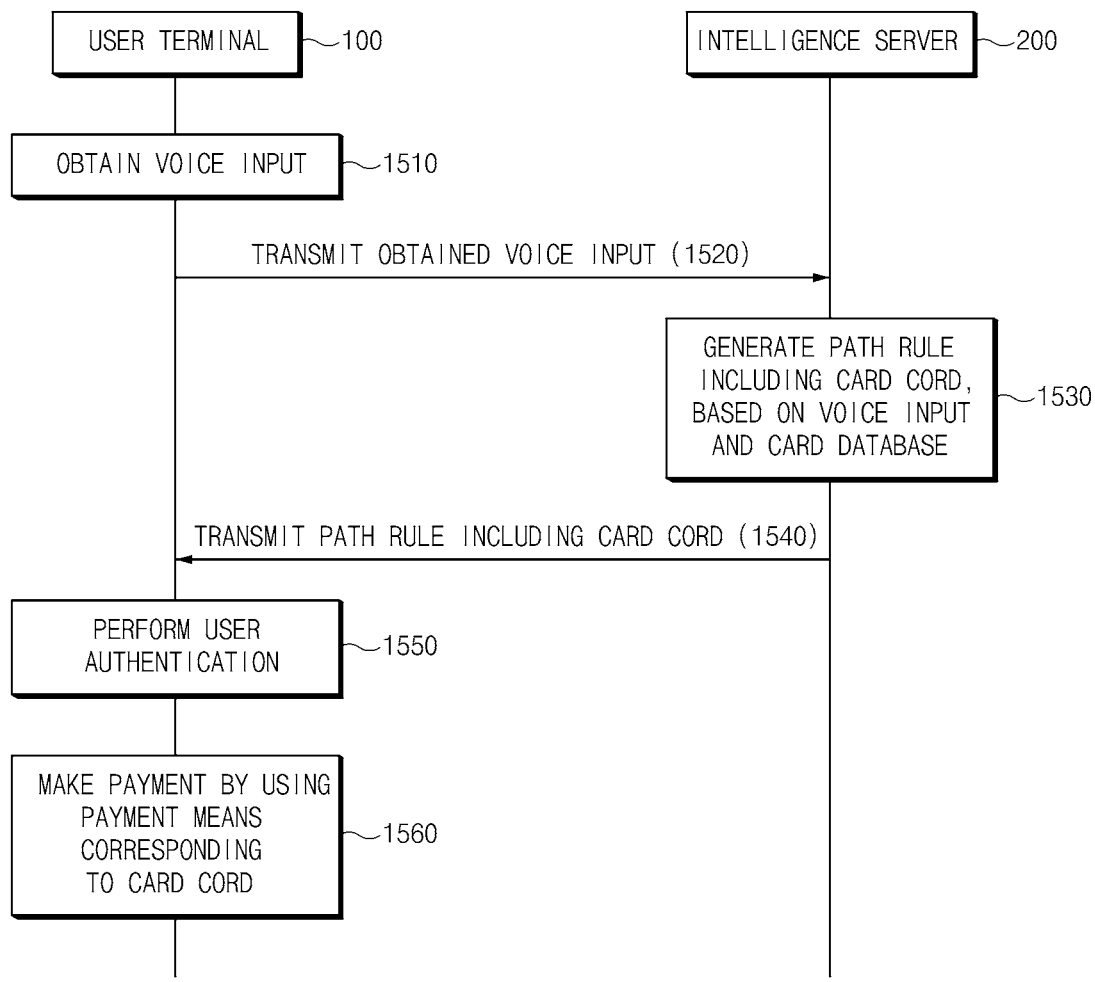
FIG. 15 is illustrates operations of a method of making a payment by using a payment means determined based on a voice input and a card database of a server, according to some embodiment.

FIG. 15 illustrates operations of a method of making a payment by using a payment means determined based on a voice input and a card database of a server, according to certain embodiments.

In certain embodiments as explained with reference to the non-limiting example of FIG. 15, it is assumed that the intelligence server 200 stores a card database including a card and a cord that corresponds to the card for each card.

Referring to the non-limiting example of FIG. 15, in operation 1510, the user terminal 100 may obtain a voice input. For example, the user terminal 100 may obtain the voice input saying that "make a payment by using Samsung card".

In operation 1520, the user terminal 100 may transmit data associated with the obtained voice input to the intelligence server 200.

In operation 1530, the intelligence server 200 may generate a path rule including a card cord, based on the data associated with the voice input and a card database. In an embodiment, the path rule may include the sequence of actions of the electronic device and a parameter for performing an action.

In certain embodiments, the intelligence server 200 may identify a card being a payment means included in the voice input, by using the data associated with a voice input and may obtain a card cord corresponding to the identified card. According to an embodiment, the intelligence server 200 may generate the path rule corresponding to a type (e.g., a credit card, a membership card, a loyalty card, or the like) of the card identified based on the obtained card cord.

In operation 1540, the intelligence server 200 may transmit the generated path rule to the user terminal 100. In an embodiment, the intelligence server 200 may transmit the path rule including the obtained card cord.

In operation 1550, the user terminal 100 may perform user authentication. For example, the user terminal 100 may perform the user authentication in various user authentication schemes (e.g., a fingerprint authentication scheme, an iris authentication scheme, a voice authentication scheme, a facial recognition authentication scheme, a pattern authentication scheme, a PIN authentication scheme, a retina authentication scheme, a heartbeat authentication scheme, and the like).

In operation 1560, the user terminal 100 may execute a payment action task by using the payment means corresponding to the card cord based on the path rule. For example, in the case where a voice input obtained in operation 1510 is "make a payment by using Samsung card", the card cord may be a card cord corresponding to Samsung card being a credit card. The user terminal 100 may execute the payment action task by using Samsung card based on the card cord corresponding to Samsung card.

Figure 16:
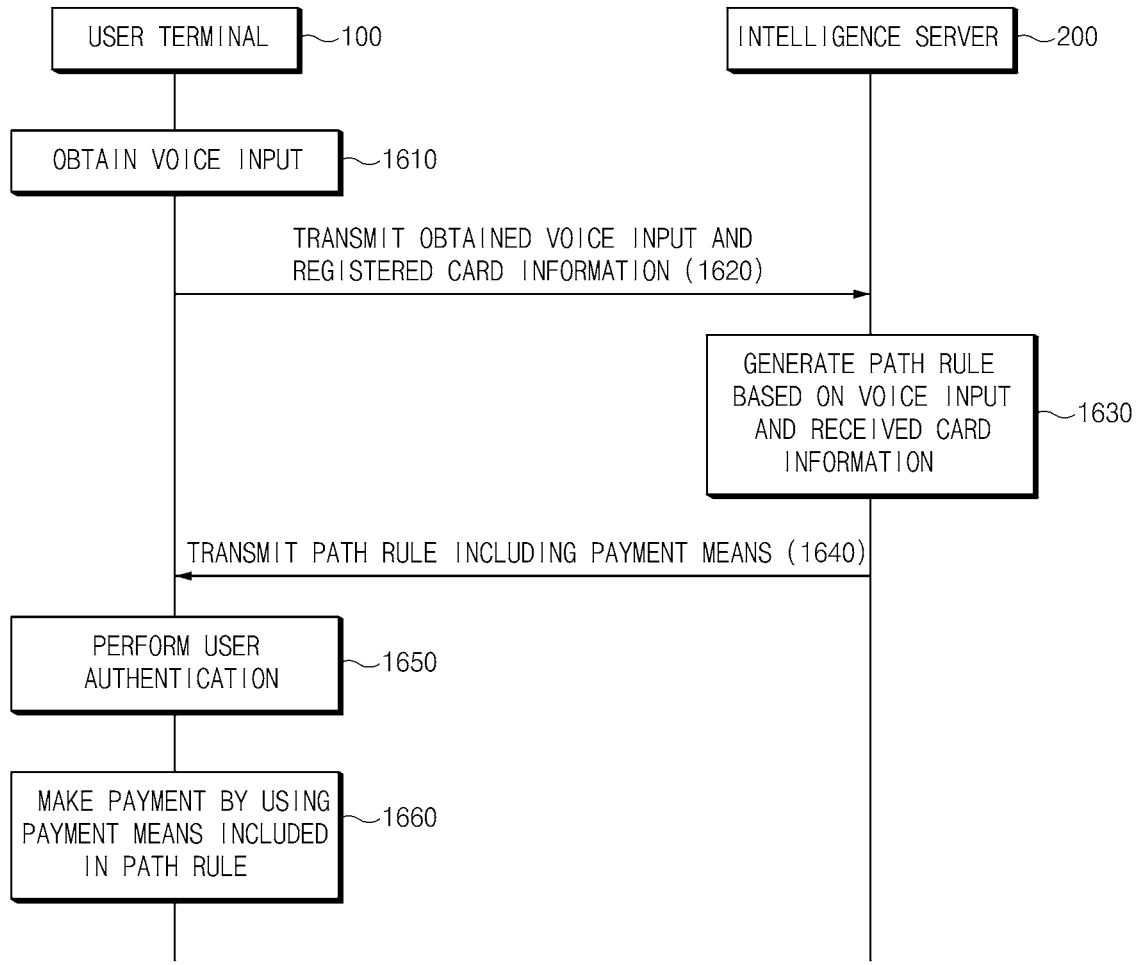
FIG. 16 illustrates operations of a method of making a payment by using a payment means determined based on a voice input and transmitted card information, according to various embodiments.

FIG. 16 illustrates operations of a method of making a payment by using a payment means determined based on a voice input and transmitted card information, according to certain embodiments.

In some embodiments as described with reference to the non-limiting example of FIG. 16, it may be assumed that the user terminal 100 stores a card database including card information stored in the user terminal 100.

Referring to the non-limiting example of FIG. 16, in operation 1610, the user terminal 100 may obtain a voice input. For example, the user terminal 100 may obtain the voice input saying that "make a payment by using the Samsung card".

In operation 1620, the user terminal 100 may transmit data associated with the obtained voice input and card information, which is included in the card database and which is stored in the user terminal 100, to the intelligence server 200. For example, in the case where the user terminal 100 stores a Samsung card, a Samsung point card, and a Silla Hotel Loyalty card, the user terminal 100 may transmit information of the stored cards to the intelligence server 200. In various embodiments, even though the user terminal 100 does not obtain a voice input, the user terminal 100 may periodically or randomly transmit the card information stored in the user terminal 100 to the intelligence server 200.

In operation 1630, the intelligence server 200 may generate a path rule based on the data associated with the voice input and the received card information. In an embodiment, the path rule may include the sequence of actions of the electronic device and a parameter for performing an action. In certain embodiments, the intelligence server 200 may identify a card being a payment means included in the voice input, by using the data associated with the voice input and may identify a type of the identified card by using the received card information. According to at least one embodiment, the intelligence server 200 may generate a path rule corresponding to the type of the identified card. For example, the intelligence server 200 may identify the phrase 'Samsung card' included in the voice input, by using the data associated with the voice input and may determine that a type of the identified Samsung card is a credit card, by using the received card information. The intelligence server 200 may generate a path rule corresponding to the credit card.

In operation 1640, the intelligence server 200 may transmit the generated path rule to the user terminal 100. In an embodiment, the intelligence server 200 may transmit the path rule including information corresponding to a card identified from the obtained card information stored in the user terminal 100.

In operation 1650, the user terminal 100 may perform user authentication. For example, the user terminal 100 may perform the user authentication in various user authentication schemes (e.g., a fingerprint authentication scheme, an iris authentication scheme, a voice authentication scheme, a facial recognition authentication scheme, a pattern authentication scheme, a PIN authentication scheme, a retina authentication scheme, a heartbeat authentication scheme, and the like).

In operation 1660, the user terminal 100 may execute a payment action task based on the path rule. For example, in the case where the voice input obtained in operation 1610 is "make a payment by using Samsung card", the path rule that the user terminal 100 receives from the intelligence server 200 may include a parameter corresponding to Samsung card. In the embodiment, the path rule may be a path rule corresponding to the credit card. The user terminal 100 may execute the payment action task by using the Samsung card based on the received path rule.

Figure 17:
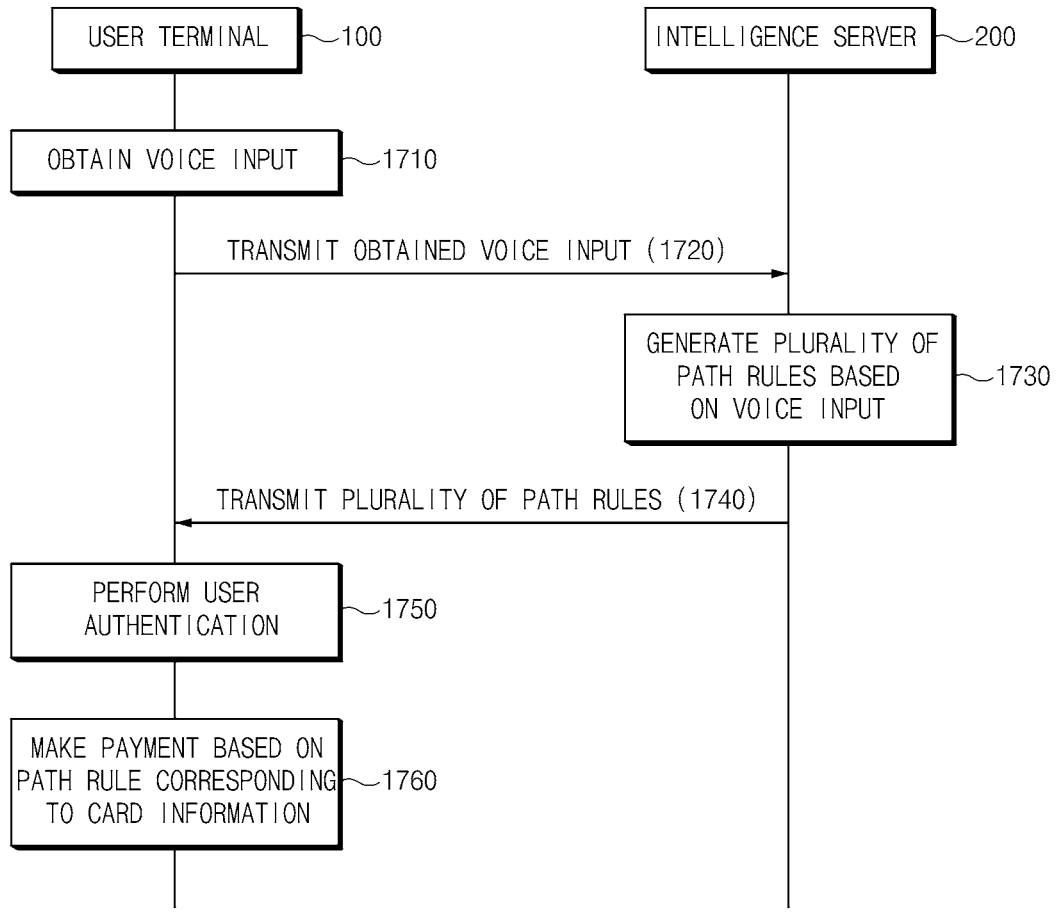
FIG. 17 illustrates operations of a method of making a payment by using a payment means determined based on a voice input and a card database of a user terminal, according to certain embodiments.

FIG. 17 illustrates operations of a method of making a payment by using a payment means determined based on a voice input and a card database of a user terminal 100, according to certain embodiments.

In certain embodiments described with reference to the non-limiting example of FIG. 17, it may be assumed that the user terminal 100 stores a card database including card information stored in the user terminal 100.

Referring to the non-limiting example of FIG. 17, in operation 1710, the user terminal 100 may receive a voice input. For example, the user terminal 100 may receive the voice input saying that "make a payment by using Samsung card".

In operation 1720, the user terminal 100 may transmit data associated with the received voice input to the intelligence server 200.

In operation 1730, the intelligence server 200 may generate a plurality of path rules based on the data associated with the voice input. In an embodiment, the path rule may include the sequence of actions of the electronic device and a parameter for performing an action. In certain embodiments, the intelligence server 200 may identify a parameter corresponding to a card name and a card type corresponding to the parameter, by using the data associated with the voice input. According to an embodiment, the intelligence server 200 may generate a path rule corresponding to the card type. For example, the intelligence server 200 may identify a 'Samsung card' parameter corresponding to the card name and the card type (e.g., a credit card, a check card, a membership card, or a loyalty card) corresponding to 'Samsung card' parameter, by using the data associated with the voice input. The intelligence server 200 may generate a plurality of path rules that respectively correspond to a credit card, a check card, a membership card, and a loyalty card and which include the 'Samsung card' parameter.

In operation 1740, the intelligence server 200 may transmit the generated plurality of path rules to the user terminal 100.

In operation 1750, the user terminal 100 may perform user authentication. For example, the user terminal 100 may perform the user authentication in various user authentication schemes (e.g., a fingerprint authentication scheme, an iris authentication scheme, a voice authentication scheme, a facial recognition authentication scheme, a pattern authentication scheme, a PIN authentication scheme, a retina authentication scheme, a heartbeat authentication scheme, and the like).

In operation 1760, the user terminal 100 may execute the payment action task based on a path rule, which corresponds to the stored card information, from among a plurality of path rules. For example, Samsung card being a credit card may be stored in the user terminal 100. The user terminal 100 may select a path rule, which corresponds to the Samsung card being a credit card, from among the plurality of path rules that respectively correspond to the received credit card, check card, membership card, and loyalty card and include the 'Samsung card' parameter. The user terminal 100 may execute the payment action task by using Samsung card based on the selected path rule.

According to various embodiments, card information stored in the card database may include a nickname designated by a user. In the case where the nickname is included in a voice input, the intelligence server 200 may transmit a nickname parameter to the user terminal 100. The user terminal 100 may select a path rule, which corresponds to a nickname, from among the plurality of path rules by using the nickname parameter and may execute the payment action task based on the selected path rule.

According to various embodiments, a default payment method may be set with respect to each card that the user terminal 100 stores. For example, the default payment method of card 'A' may be a MST radiation method, and the default payment method of card 'B' may be a NFC radiation method. In the case where the user terminal 100 makes a payment by using card 'A' based on the path rule, the user terminal 100 may execute the payment action task by using the MST radiation method.

Figure 18:
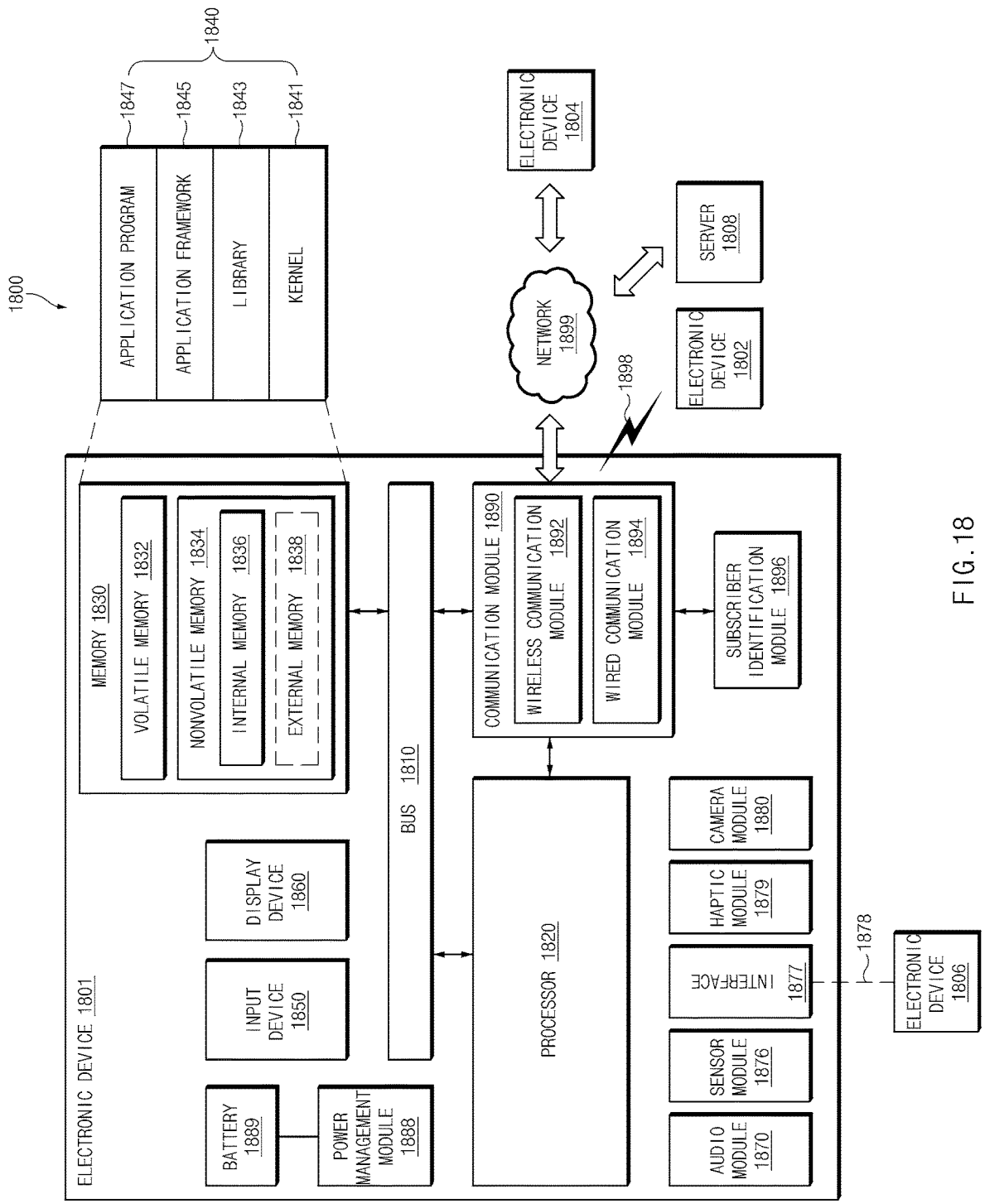
FIG. 18 illustrates, in block format, an electronic device in a network environment according to various embodiments.

FIG. 18 illustrates, in block diagram format, an electronic device 1801 in a network environment 1800, according to various embodiments. According to various embodiments disclosed in the present disclosure, the electronic device may include various types of devices. For example, the electronic device may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the present disclosure, the term "user" used herein may refer to a person who uses the electronic device or may refer to a device (e.g., an artificial intelligence electronic device) that uses the electronic device.

Referring to the non-limiting example of FIG. 18, under the network environment 1800, the electronic device 1801 (e.g., the user terminal 100 or the electronic device 601) may communicate with an electronic device 1802 through first network 1898 or may communication with an electronic device 1804 or a server 1808 through a network 1899. According to certain embodiments, the electronic device 1801 may communicate with the electronic device 1804 through the server 1808.

According to various embodiments, the electronic device 1801 may include a bus 1810, a processor 1820 (e.g., the processor 150 or the processor 690) a memory 1830, an input device 1850 (e.g., a microphone or a mouse), a display 1860, an audio module 1870, a sensor module 1876, an interface 1877, a haptic module 1879, a camera module 1880, a power management module 1888, a battery 1889, a communication module 1890, and a subscriber identification module 1896. According to certain embodiments, the electronic device 1801 may not include at least one (e.g., the display 1860 or the camera module 1880) of the above-described elements or may further include other element(s).

For example, the bus 1810 may interconnect the above-described elements 1820 to 1890 and may include a circuit for conveying signals (e.g., a control message or data) between the above-described elements.

The processor 1820 may include one or more of a central processing unit (CPU), an application processor (AP), a graphic processing unit (GPU), an image signal processor (ISP) of a camera or a communication processor (CP). According to an embodiment, the processor 1820 may be implemented with a system on chip (SoC) or a system in package (SiP). For example, the processor 1820 may drive an operating system (OS) or an application to control at least one of another element (e.g., hardware or software element) connected to the processor 1820 and may process and compute various data. The processor 1820 may load a command or data, which is received from at least one of other elements (e.g., the communication module 1890), into a volatile memory 1832 to process the command or data and may store the process result data into a nonvolatile memory 1834.

The memory 1830 (e.g., the memory 140 or the memory 630) may include, for example, the volatile memory 1832 or the nonvolatile memory 1834. The volatile memory 1832 may include, for example, a random access memory (RAM) (e.g., a dynamic RAM (DRAM), a static RAM (SRAM), or a synchronous dynamic RAM (SDRAM)). The nonvolatile memory 1834 may include, for example, a programmable read-only memory (PROM), a one-time programmable read-only memory (OTPROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 1834 may be configured in the form of an internal memory 1836 or the form of an external memory 1838 which is available through connection only if necessary, according to the connection with the electronic device 1801. The external memory 1838 may further include a flash drive such as compact flash (CF), secure digital (SD), micro secure digital (Micro-SD), mini secure digital (Mini-SD), extreme digital (xD), a multimedia card (MMC), or a memory stick. The external memory 1838 may be operatively or physically connected with the electronic device 1801 in a wired manner (e.g., a cable or a universal serial bus (USB)) or a wireless (e.g., Bluetooth) manner.

For example, the memory 1830 may store, for example, at least one different software element, such as an instruction or data associated with the program 1840, of the electronic device 1801. The program 1840 may include, for example, a kernel 1841, a library 1843, an application framework 1845 or an application program (interchangeably, "application") 1847.

The input device 1850 may include a microphone, a mouse, or a keyboard. According to an embodiment, the keyboard may include a keyboard physically connected or a keyboard virtually displayed through the display 1860.

The display 1860 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to certain embodiments, the display may be flexibly, transparently, or wearably implemented. The display may include touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1801.

The audio module 1870 (e.g., the audio interface 660) may convert, for example, from a sound into an electrical signal or from an electrical signal into the sound. According to an embodiment, the audio module 1870 may acquire sound through the input device 1850 (e.g., a microphone) or may output sound through an output device (not illustrated) (e.g., a speaker or a receiver) included in the electronic device 1801, an external electronic device (e.g., the electronic device 1802 (e.g., a wireless speaker or a wireless headphone)) or an electronic device 1806 (e.g., a wired speaker or a wired headphone) connected with the electronic device 1801

The sensor module 1876 (e.g., the sensor module 650) may measure or detect, for example, an internal operating state (e.g., power or temperature) or an external environment state (e.g., an altitude, a humidity, or brightness) of the electronic device 1801 to generate an electrical signal or a data value corresponding to the information of the measured state or the detected state. The sensor module 1876 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (FIRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1876 may further include a control circuit for controlling at least one or more sensors included therein. According to an embodiment, the electronic device 1801 may control the sensor module 1876 by using the processor 1820 or a processor (e.g., a sensor hub) separate from the processor 1820. In the case that the separate processor (e.g., a sensor hub) is used, while the processor 1820 is in a sleep state, the electronic device 1801 may control at least a portion of the operation or the state of the sensor module 1876 by operating the separate processor without awakening the processor 1820.

According to certain embodiments, the interface 1877 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 1878 may physically connect the electronic device 1801 and the electronic device 1806. According to certain embodiments, the connector 1878 may include, for example, an USB connector, an SD card/MMC connector, or an audio connector (e.g., a headphone connector).

The haptic module 1879 may convert an electrical signal into mechanical stimulation (e.g., vibration or motion) or into electrical stimulation. For example, the haptic module 1879 may apply tactile or kinesthetic stimulation to a user. The haptic module 1879 may include, for example, a motor, a piezoelectric element, or an electric stimulator.

The camera module 1880 may capture, for example, a still image and a moving picture. According to an embodiment, the camera module 1880 may include at least one lens (e.g., a wide-angle lens and a telephoto lens, or a front lens and a rear lens), an image sensor, an image signal processor, or a flash (e.g., a light emitting diode or a xenon lamp).

The power management module 1888, which is to manage the power of the electronic device 1801, may constitute at least a portion of a power management integrated circuit (PMIC).

The battery 1889 may include a primary cell, a secondary cell, or a fuel cell and may be recharged by an external power source to supply power at least one element of the electronic device 1801.

The communication module 1890 (e.g., the wireless communication circuit 640) may establish a communication channel between the electronic device 1801 and an external device (e.g., the first external electronic device 1802, the second external electronic device 1804, or the server 1808). The communication module 1890 may support wired communication or wireless communication through the established communication channel. According to certain embodiments, the communication module 1890 may include a wireless communication module 1892 or a wired communication module 1894. The communication module 1890 may communicate with the external device through a first network 1898 (e.g. a wireless local area network such as Bluetooth or infrared data association (IrDA)) or a second network 1899 (e.g., a wireless wide area network such as a cellular network) through a relevant module among the wireless communication module 1892 or the wired communication module 1894.

The wireless communication module 1892 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1892 supports cellar communication, the wireless communication module 1892 may, for example, identify or authenticate the electronic device 1801 within a communication network using the subscriber identification module (e.g., a SIM card) 1896. According to certain embodiments, the wireless communication module 1892 may include a communication processor (CP) separate from the processor 2820 (e.g., an application processor (AP). In this case, the communication processor may perform at least a portion of functions associated with at least one of elements 1810 to 1896 of the electronic device 1801 in substitute for the processor 1820 when the processor 1820 is in an inactive (sleep) state, and together with the processor 1820 when the processor 1820 is in an active state. According to at least one embodiment, the wireless communication module 1892 may include a plurality of communication modules, each supporting only a relevant communication scheme among cellular communication, short-range wireless communication, or a GNSS communication scheme.

The wired communication module 1894 may include, for example, include a local area network (LAN) service, a power line communication, or a plain old telephone service (POTS).

For example, the first network 1898 may employ, for example, Wi-Fi direct or Bluetooth for transmitting or receiving instructions or data through wireless direct connection between the electronic device 1801 and the first external electronic device 1802. The second network 1899 may include a telecommunication network (e.g., a computer network such as a LAN or a WAN, the Internet or a telephone network) for transmitting or receiving instructions or data between the electronic device 1801 and the second electronic device 1804.

According to embodiments, the instructions or the data may be transmitted or received between the electronic device 1801 and the second external electronic device 1804 through the server 1808 connected with the second network. Each of the external first and second external electronic devices 1802 and 1804 may be a device of which the type is different from or the same as that of the electronic device 1801. According to various embodiments, all or a part of operations that the electronic device 1801 will perform may be executed by another or a plurality of electronic devices (e.g., the electronic devices 1802 and 1804 or the server 1808). According to certain embodiments, in the case that the electronic device 1801 executes any function or service automatically or in response to a request, the electronic device 1801 may not perform the function or the service internally, but may alternatively or additionally transmit requests for at least a part of a function associated with the electronic device 1801 to any other device (e.g., the electronic device 1802 or 1804 or the server 1808). The other electronic device (e.g., the electronic device 1802 or 1804 or the server 1808) may execute the requested function or additional function and may transmit the execution result to the electronic device 1801. The electronic device 1801 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the context, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 430).

The term "module" used in this specification may include a unit implemented with hardware, software, or firmware. For example, the term "module" may be interchangeably used with the term "logic", "logic block", "component", "circuit", and the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 430) in the form of a program module. The instruction, when executed by a processor (e.g., a processor 420), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

According an embodiment of the present disclosure, an electronic device may include a housing, a touch screen display exposed through a first portion of the housing, a biometric sensor exposed through a second portion of the housing or integrated with the touch screen display, an audio interface disposed in a third portion of the housing, a wireless communication circuit placed inside the housing, a processor disposed inside the housing and electrically connected to the touch screen display, the biometric sensor, the audio interface, or the wireless communication circuit, and a memory disposed inside the housing and electrically connected to the processor. The memory may store instructions, when executed, causing the processor to receive, from a user, a selection of a first authentication scheme associated with at least one of the touch screen display, the biometric sensor, or the audio interface to use the electronic device for a payment in a default scheme, to set the first authentication scheme as the default scheme, after setting the first authentication scheme, to receive a user utterance indicating a payment action task using a second authentication scheme different from the first authentication scheme, by using the audio interface, to transmit data associated with the user utterance to an external server by using the wireless communication circuit, to receive a response including a state sequence of the electronic device for executing the payment action task and a parameter associated with the second authentication scheme, by using the wireless communication circuit, to execute the payment action task by using the electronic device depending on the state sequence in the second authentication scheme, and to provide a user interface for changing the default scheme to the second authentication scheme.

In certain embodiments, the instructions may cause the processor, after completing the execution of the payment action task, to compare the second authentication scheme associated with the parameter with the first authentication scheme and to provide the user interface to the user based at least partly on a result of the comparison.

In certain embodiments, the instructions may cause the processor to provide the user interface to a user by using at least one of the touch screen display or the audio interface.

In various embodiments, the instructions may cause the processor to change the default scheme to the second authentication scheme based on a user input through the user interface.

In some embodiments, the biometric sensor may include at least one of a fingerprint sensor, an iris sensor, a facial recognition authentication sensor, a retina sensor, or a heartbeat sensor.

In at least one embodiment, the second authentication scheme may be a biometric authentication scheme, and the instructions may cause the processor, before executing the payment action task, to call an external server performing authentication in the biometric authentication scheme by using the wireless communication circuit.

In certain embodiments, the external server may include a fast identity online (FIDO) server.

In various embodiments, the user utterance may further indicate a payment means for making the payment, and the instructions may cause the processor to further obtain a parameter associated with the payment means for executing the payment action task from the user utterance and to execute the payment action task by using card information corresponding to the parameter associated with the payment means.

In at least one embodiment, the payment means may include at least one of a type of a payment card, a payment card issuer, or a payment card name.

According certain embodiments of the present disclosure, an electronic device may include a housing, an audio interface disposed in a first portion of the housing, a processor disposed inside the housing and electrically connected to the audio interface; and a memory disposed inside the housing, electrically connected to the processor, and storing a payment application, a user authentication scheme of which is set to a first authentication scheme. The memory may store instructions, when executed, causing the processor to receive a user utterance by using the audio interface, wherein the user utterance indicates a payment action task using a second authentication scheme different from the first authentication scheme, to obtain a sequence of actions of the electronic device for executing the payment action task and a parameter associated with the second authentication scheme, from the user utterance, to execute the payment action task depending on the sequence of actions by using the electronic device in the second authentication scheme, and to provide a user with a user interface for changing the user authentication scheme to the second authentication scheme.

In some embodiments, the electronic device may further include a touch screen display exposed through a second portion of the housing and electrically connected to the processor, and a biometric sensor exposed through a third portion of the housing, integrated with the touch screen display, and electrically connected to the processor. The user authentication scheme may be set by a user input to select the first authentication scheme associated with at least one of the touch screen display, the biometric sensor, or the audio interface.

In certain embodiments, the biometric sensor may include at least one of a fingerprint sensor, an iris sensor, a facial recognition authentication sensor, a retina sensor, or a heartbeat sensor.

In various embodiments, the electronic device may further include a wireless communication circuit disposed inside the housing and electrically connected to the processor. The instructions may cause the processor to transmit data associated with the user utterance to an external server through the wireless communication circuit, to receive a response generated based on the data, from the external server through the wireless communication circuit, and to obtain the sequence of actions of the electronic device and the parameter associated with the second authentication scheme, from the received response.

In certain embodiments, the instructions may cause the processor to extract the sequence of actions of the electronic device and the parameter associated with the second authentication scheme, from the user utterance.

In some embodiments, the electronic device may further include a short range communication circuit disposed inside the housing and electrically connected to the processor. The instructions may cause the processor to execute the payment action task by using the short range communication circuit.

In certain embodiments, the short range communication circuit may include at least one of a magnetic secure transmission (MST) module or a near field communication (NFC) module.

In embodiments, the instructions may cause the processor, after completing the execution of the payment action task, to compare the second authentication scheme associated with the parameter with the first authentication scheme and to provide the user with the user interface based at least partly on a result of the comparison.

In various embodiments, the electronic device may further include a touch screen display exposed through a second portion of the housing and electrically connected to the processor. The instructions may cause the processor to provide the user with the user interface by using at least one of the touch screen display or the audio interface.

According certain embodiments of the present disclosure, an electronic device may include a housing, an audio interface disposed in a first portion of the housing, a processor disposed inside the housing and electrically connected to the audio interface, and a memory disposed inside the housing, electrically connected to the processor, and storing a payment application, a user authentication scheme of which is set to a first authentication scheme. The memory may store instructions, when executed, causing the processor to receive a user utterance through the audio interface, wherein the user utterance indicates a payment action task using a second authentication scheme different from the first authentication scheme, to obtain a sequence of actions of the electronic device for executing the payment action task and a parameter associated with the second authentication scheme, from the user utterance, to change the user authentication scheme to the second authentication scheme, and to execute the payment action task depending on the sequence of actions by using the electronic device in the second authentication scheme.

In certain embodiments, the instructions may cause the processor, after completing the execution of the payment action task, to change the user authentication scheme to the first authentication scheme based on a user input.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a touch screen display;
a biometric sensor;
an audio interface;
a wireless communication circuit;
a processor electrically connected to the touch screen display, the biometric sensor, the audio interface, and the wireless communication circuit; and
a memory electrically connected to the processor, wherein the memory stores instructions that, when executed, cause the processor to:
receive, from a user, a selection of a first authentication scheme to be used in a payment with the electronic device, the first authentication scheme associated with at least one of the touch screen display, the biometric sensor, or the audio interface,
set the first authentication scheme as a default scheme for the electronic device,
after setting the first authentication scheme, receive a user utterance indicating a request to perform a payment action task,
transmit data associated with the user utterance to an external server by using the wireless communication circuit,
after transmitting the data, receive, via the wireless communication circuit from the external server, a response including (i) a sequence of actions for performing the payment action task and (ii) a parameter that is based on the user utterance,
when the user utterance does not indicate an authentication scheme for the payment action task, perform the payment action task based on the sequence of action and the default scheme, and
when the user utterance indicates a second authentication scheme different from the default scheme, perform the payment action task based on the sequence of actions and the second authentication scheme.

2. The electronic device of claim 1, wherein the instructions cause the processor to:
after completing performing the payment action task, perform a comparison of the second authentication scheme and the first authentication scheme; and
provide a user interface for changing the default scheme to the second authentication scheme, to the user based at least partly on a result of the comparison.

3. The electronic device of claim 2, wherein the instructions cause the processor to:
provide the user interface to the user by using at least one of the touch screen display or the audio interface.

4. The electronic device of claim 2, wherein the instructions cause the processor to:
change the default scheme to the second authentication scheme based on a user input through the user interface.

5. The electronic device of claim 1, wherein the biometric sensor includes at least one of a fingerprint sensor, an iris sensor, a facial recognition authentication sensor, a retina sensor, or a heartbeat sensor.

6. The electronic device of claim 1, wherein:
the second authentication scheme is a biometric authentication scheme, and
the instructions cause the processor to:
before executing the payment action task, call another external server performing authentication in the biometric authentication scheme by using the wireless communication circuit.

7. The electronic device of claim 6, wherein the other external server includes a fast identity online (FIDO) server.

8. The electronic device of claim 1, wherein:
the user utterance further indicates a payment means for making the payment, and
the instructions cause the processor to:
further obtain an additional parameter associated with the payment means for performing the payment action task from the user utterance; and
perform the payment action task by using card information corresponding to the parameter associated with the payment means.

9. The electronic device of claim 8, wherein the payment means includes at least one of a type of a payment card, a payment card issuer, or a payment card name.

10. An electronic device comprising:
an audio interface;
a processor electrically connected to the audio interface; and
a memory electrically connected to the processor and configured to store a payment application, a user authentication scheme of which is set to a first authentication scheme, wherein the memory stores instructions, when executed, causing the processor to:
receive a user utterance by using the audio interface, wherein the user utterance indicates a request to perform a payment action task using a second authentication scheme instead of the first authentication scheme, wherein the second authentication scheme is different than the first authentication scheme,
obtain (i) a sequence of actions of the electronic device for performing the payment action task and (ii) a parameter that is based on the user utterance an associated with the second authentication scheme, wherein the parameter indicates a payment form to be used when the payment action task is performed, and
perform the payment action task, based on the parameter and depending on the sequence of actions by using the electronic device in the second authentication scheme.

11. The electronic device of claim 10, further comprising:
a touch screen display and electrically connected to the processor; and
a biometric sensor integrated with the touch screen display, and electrically connected to the processor,
wherein the user authentication scheme is set by a user input to select the first authentication scheme associated with at least one of the touch screen display, the biometric sensor, or the audio interface.

12. The electronic device of claim 11, wherein the biometric sensor includes at least one of a fingerprint sensor, an iris sensor, a facial recognition authentication sensor, a retina sensor, or a heartbeat sensor.

13. The electronic device of claim 10, further comprising:
a wireless communication circuit electrically connected to the processor,
wherein the instructions cause the processor to:
transmit data associated with the user utterance to an external server through the wireless communication circuit;
receive a response generated based on the data, from the external server through the wireless communication circuit; and obtain the sequence of actions of the electronic device and the parameter associated with the second authentication scheme from the received response.

14. The electronic device of claim 10, wherein the instructions cause the processor to:
extract the sequence of actions of the electronic device and the parameter associated with the second authentication scheme from the user utterance.

15. The electronic device of claim 10, further comprising:
a short range communication circuit electrically connected to the processor,
wherein the instructions cause the processor to:
perform the payment action task by using the short range communication circuit.

16. The electronic device of claim 15, wherein the short range communication circuit includes at least one of a magnetic secure transmission (MST) module or a near field communication (NFC) module.

17. The electronic device of claim 10, wherein the instructions cause the processor to:
after completing performing the payment action task, perform a comparison of the second authentication scheme associated with the parameter with the first authentication scheme; and
provide a user with a user interface for changing a default scheme to the second authentication scheme, based at least partly on a result of the comparison.

18. The electronic device of claim 17, further comprising:
a touch screen display electrically connected to the processor,
wherein the instructions cause the processor to:
provide the user with the user interface by using at least one of the touch screen display or the audio interface.

19. An electronic device comprising:
an audio interface;
a processor electrically connected to the audio interface; and
a memory disposed electrically connected to the processor and configured to store a payment application, a user authentication scheme of which is set to a first authentication scheme,
wherein the memory stores instructions, when executed, causing the processor to:
receive a user utterance through the audio interface, wherein the user utterance indicates a request to perform a payment action task using a second authentication scheme instead of the first authentication scheme, wherein the second authentication scheme is different than the first authentication scheme,
obtain (i) a sequence of actions of the electronic device for performing the payment action task and (ii) a parameter that is based on the user utterance and associated with the second authentication scheme,
change the user authentication scheme to the second authentication scheme,
determine whether the sequence of actions include an action requiring at least a specified time,
when the second authentication scheme is a biometric authentication scheme, call a fast identity online (FIDO) server before performing the payment action task, and
perform the payment action task depending on the sequence of actions by using the electronic device in the second authentication scheme.

20. The electronic device of claim 19, wherein the instructions cause the processor to: after completing performing the payment action task, change the user authentication scheme to the first authentication scheme based on a user input.

* * * * *